(12) United States Patent
Wang et al.

(10) Patent No.: US 11,046,027 B2
(45) Date of Patent: Jun. 29, 2021

(54) EXPANDABLE TOOLING SYSTEMS AND METHODS

(71) Applicant: The Boeing Company, Chicago, IL (US)

(72) Inventors: Xiaoxi Wang, Mukilteo, WA (US); Gary Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 16/053,733

(22) Filed: Aug. 2, 2018

(65) Prior Publication Data
US 2020/0039156 A1 Feb. 6, 2020

(51) Int. Cl.
| | |
|---|---|
| *B29C 70/44* | (2006.01) |
| *B64F 5/10* | (2017.01) |
| *B29C 33/54* | (2006.01) |
| *B29C 33/46* | (2006.01) |
| *B29C 33/40* | (2006.01) |
| B64C 1/06 | (2006.01) |
| B29C 43/36 | (2006.01) |
| B64C 1/00 | (2006.01) |
| B29L 31/30 | (2006.01) |
| B29C 43/32 | (2006.01) |
| B64C 3/18 | (2006.01) |

(52) U.S. Cl.
CPC ............ *B29C 70/446* (2013.01); *B29C 33/40* (2013.01); *B29C 33/46* (2013.01); *B29C 33/54* (2013.01); *B64F 5/10* (2017.01); B29C 2043/3244 (2013.01); B29C 2043/3649 (2013.01); B29C 2043/3665 (2013.01); B29L 2031/3082 (2013.01); B29L 2031/3085 (2013.01); B64C 1/064 (2013.01); B64C 3/182 (2013.01); B64C 2001/0072 (2013.01)

(58) Field of Classification Search
CPC ....... B29C 70/446; B29C 33/40; B29C 33/46; B64F 5/10
See application file for complete search history.

(56) References Cited

U.S. PATENT DOCUMENTS

| | | |
|---|---|---|
| 4,302,549 A | 11/1981 | Crowley |
| 4,303,756 A | 12/1981 | Kajimura et al. |
| 4,782,098 A | 11/1988 | Allen et al. |
| (Continued) | | |

OTHER PUBLICATIONS

Praller, Andreas, "Foaming Plastics with Inert Gases", Kunststoffe Plast Europe, Jun. 2005, 4 pages.
(Continued)

*Primary Examiner* — Joseph S Del Sole
*Assistant Examiner* — Yung-Sheng M Tsui
(74) *Attorney, Agent, or Firm* — Kolisch Hartwell, P.C.

(57) ABSTRACT

Prior to curing a composite workpiece assembly, an expandable element can be inserted into a cavity of the workpiece assembly. The expandable element is configured to expand when a predetermined change is produced in an attribute of the element. The attribute can be a temperature of the element. The element is expanded by producing the predetermined change, and the workpiece assembly is cured while the expanded element is in the cavity, so that the expanded element applies positive pressure to inner surfaces of the cavity during curing. The expanded element can be removed from the cavity after curing. The expanded element can comprise a plurality of expandable pellets.

20 Claims, 16 Drawing Sheets

(56) References Cited

U.S. PATENT DOCUMENTS

| | | | |
|---|---|---|---|
| 8,540,921 | B2 | 9/2013 | Senibi et al. |
| 8,790,565 | B2 * | 7/2014 | Miller .................. B29C 70/222 |
| | | | 264/266 |
| 2007/0080481 | A1 * | 4/2007 | Kismarton .......... B29C 43/3642 |
| | | | 264/236 |
| 2008/0111024 | A1 | 5/2008 | Lee et al. |
| 2010/0140842 | A1 | 6/2010 | Nelson et al. |
| 2011/0308711 | A1 * | 12/2011 | Coleman .............. B29C 70/443 |
| | | | 156/189 |
| 2013/0134621 | A1 * | 5/2013 | Tsotsis ................. B29C 70/528 |
| | | | 264/177.2 |
| 2014/0299257 | A1 | 10/2014 | Pearson et al. |
| 2020/0148851 | A1 * | 5/2020 | Queiroz Da Fonseca ................... |
| | | | B29B 7/88 |
| 2020/0207033 | A1 | 7/2020 | Wang et al. |
| 2021/0001519 | A1 | 1/2021 | Wang et al. |
| 2021/0001571 | A1 | 1/2021 | Santiago et al. |

OTHER PUBLICATIONS

The Linde Group, "Facts About. Foaming Plastics with Inert Gases", Linde North America, Inc. Brochure, 2012, 12 pages.

AKZO NOBEL NV, Expancel Microspheres: The World's Favorite Secret Ingredient, 2016, 16 pages.

AKZO NOBEL NV, Product Specification for Expancel Microspheres, Expancel MB, Nov. 2017, 2 pages.

Easy Composite LTD., Beginner's Guide to Out of Autoclave Carbon Fibre, downloaded from Internet on May 5, 2019, at https://www.easycomposites.co.uk/downloads/TDS/EC-TDS-Beginners-Guide-to-Prepreg-Carbon-Fibre.pdf, 21 pages.

* cited by examiner

EXPANDABLE TOOLING SYSTEMS AND METHODS

FIELD

This disclosure relates to systems and methods for manufacturing composite parts. More specifically, the disclosed examples relate to internal tooling for composite part manufacture.

INTRODUCTION

During the process of curing a composite structure, it may be beneficial or necessary to apply positive pressure to the structure from within. The positive pressure may be applied by internal tooling inserted into the structure (e.g., into a cavity defined by the structure) prior to curing. After the composite structure has been cured, the internal tooling is no longer necessary, but removing the tooling from the cured structure is typically difficult. In some existing methods for curing composite structures, the problem of removing the tooling after curing the structure is avoided by leaving the tooling within the cured structure. For example, if the cured composite structure is a component of an aircraft, the internal tooling may be left in the structure as a "fly-away" component that becomes part of the aircraft.

In other existing methods, the internal tooling is designed to be removable. However, manufacturing the removable tooling is typically time-consuming and expensive, as is the process of removing the tooling from the cured composite structure.

SUMMARY

The present disclosure provides systems, apparatuses, and methods relating to expandable tooling for curing composite structures. In some examples, a method of manufacturing a first composite workpiece comprises inserting an unexpanded expandable first element into a cavity of an uncured composite workpiece assembly including at least the first uncured workpiece, the unexpanded first element being configured to expand when a predetermined change is produced in an attribute of the unexpanded first element; expanding the unexpanded first element by producing the predetermined change in the attribute of the unexpanded first element; and curing the composite workpiece assembly while the expanded first element is in the cavity.

In some examples, a method of manufacturing a part including a workpiece comprises positioning an unexpanded expandable first element within a cavity of a workpiece assembly including the workpiece; positioning the workpiece assembly within a mold; placing the mold against an outer surface of the workpiece assembly; and applying a positive pressure to an inner surface of the workpiece assembly forming the cavity by heating the unexpanded first element from a first temperature to a second temperature higher than the first temperature to expand the unexpanded first element to produce a predetermined pressure against the inner surface of the workpiece assembly.

In some examples, a method of manufacturing an aircraft stiffener comprises inserting an unexpanded first element into a cavity of an uncured composite workpiece assembly including the stiffener, the unexpanded first element being configured to expand when heated by a predetermined amount; expanding the unexpanded first element by heating the first element by a predetermined amount from a first temperature; curing the composite workpiece assembly while the expanded first element is in the cavity; and removing the expanded first element from the cavity after curing the composite workpiece assembly.

Features, functions, and advantages may be achieved independently in various examples of the present disclosure, or may be combined in yet other examples, further details of which can be seen with reference to the following description and drawings.

DETAILED DESCRIPTION

Figure 2:
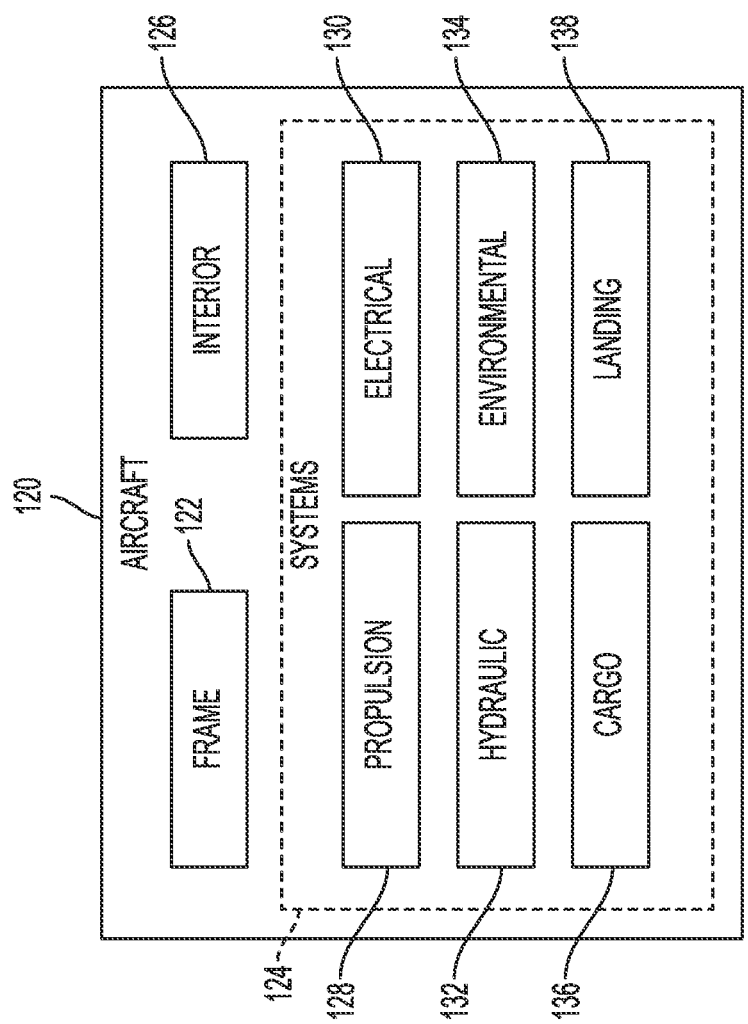
FIG. 2 is a schematic diagram of an illustrative aircraft.

Various aspects and examples of an expandable tooling system, as well as related methods, are described below and illustrated in the associated drawings. Unless otherwise specified, an expandable tooling system, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through I, each of which is labeled accordingly.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

Overview

In general, an expandable tooling system includes an expandable first element configured to apply positive pressure within a composite workpiece during the process of curing the workpiece. Typically, the expandable first element is inserted in an unexpanded state into a cavity defined by an uncured composite workpiece or assembly of workpieces. Prior to and/or during the curing process, the unexpanded first element is caused to expand such that it pushes against interior surfaces of the cavity and helps the workpiece to retain a desired shape during curing. Without the expandable first element, the workpiece cavity could collapse during the curing process. After the part has been cured, the expanded first element can be removed from the cavity.

The expandable first element is typically configured to expand when a predetermined change is produced in the first element. The predetermined change is typically a change in a physical property, chemical property, and/or any other suitable property of the first element that is associated with expansion of the first element. Unless otherwise specified, expansion of the first element refers to an increase in the volume of the first element, surface area of the first element, and/or spatial extent of the first element in one or more dimensions. For example, the first element can be configured to expand when the temperature of the first element is raised from a lower temperature, such as an ambient temperature, to a predetermined higher temperature. Accordingly, in cases in which curing the workpiece includes raising the temperature of the workpiece, the first element expands inside the cavity during the curing process. The expanding or expanded first element supports the cavity from within during the curing process.

The expandable first element can comprise one or more expandable pellets (also called expandable beads) each configured to expand (e.g., to a predetermined volume) when heated to a predetermined temperature. The number and composition of expandable pellets can be selected such that the plurality of expandable pellets applies a desired pressure to the interior surfaces of the cavity at one or more stages of the curing process. For example, the composition of the expandable pellets can be designed to achieve a desired relationship between the volume of each expandable pellet and the temperature of the expandable pellet as a function of time. After the composite workpiece has been cured, the expanded pellets can be easily removed from the cavity. For example, the expanded pellets can be removed individually or several at a time through an opening of the cavity of the cured workpiece. Systems and methods described herein can be configured to facilitate separation of the expanded pellets from each other so that they can be extracted from the cavity of the cured workpiece. The resulting cured workpiece has less total weight than a comparable workpiece having "fly-away" tooling.

The composite workpiece supported by the expandable first element can be a component of an aircraft. For example, the composite workpiece can be a stiffener for an aircraft. The stiffener, which may also be referred to as a stringer, can be combined with a skin to form a stiffened aircraft structural panel. In some cases, the stiffener and the skin can be co-cured, such that the stiffener is bonded onto the skin during the process of curing the stiffener and skin. The expandable first element can be inserted between the uncured stiffener and the uncured skin (e.g., into a cavity defined by the uncured stiffener and the uncured skin). Prior to and/or during the curing process, the expandable first element can be made to expand such that it applies positive pressure to the stiffener and/or the skin and thereby helps the stiffener and/or skin to retain their shapes.

Examples, Components, and Alternatives

The following sections describe selected aspects of exemplary removable expandable tooling, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Aircraft and Associated Method

Figure 1:
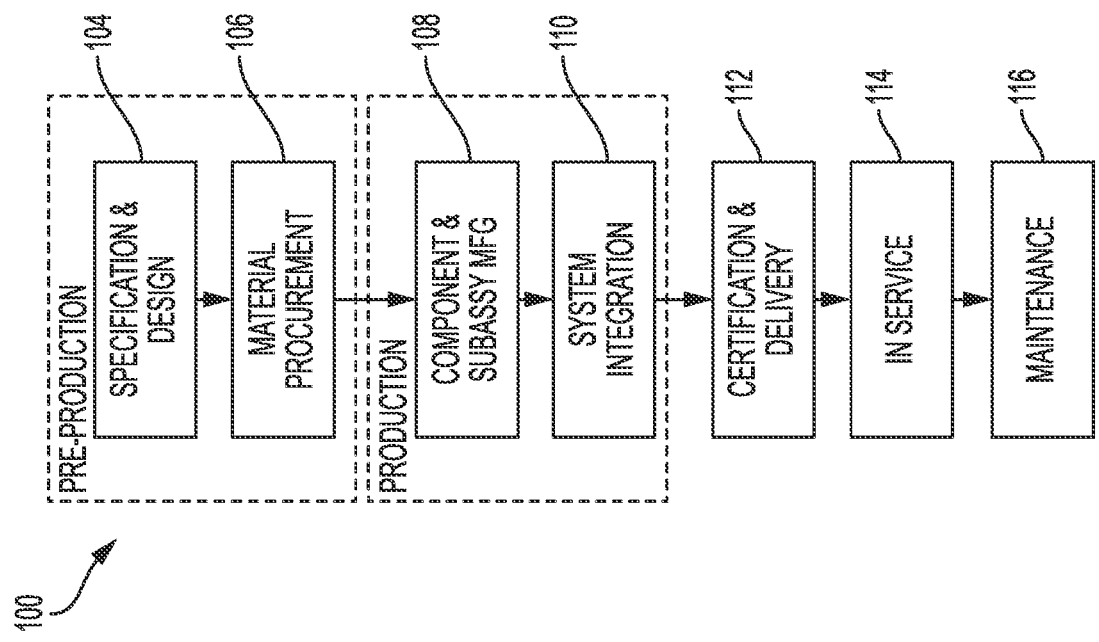
FIG. 1 is a flowchart depicting steps of an illustrative aircraft manufacturing and service method.
Figure 3:
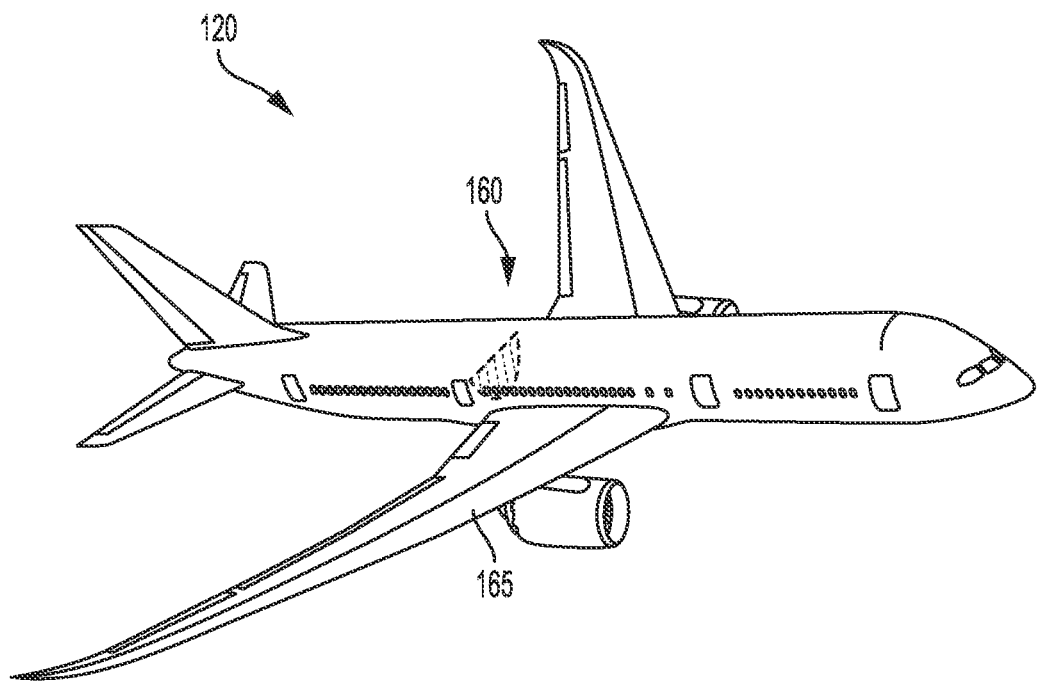
FIG. 3 is an isometric view of an illustrative aircraft.

Examples disclosed herein may be described in the context of an illustrative aircraft manufacturing and service method 100 (see FIG. 1) and an illustrative aircraft 120 (see FIGS. 2 and 3). Method 100 includes a plurality of processes, stages, or phases. During pre-production, method 100 can include a specification and design phase 104 of aircraft 120 and a material procurement phase 106. During production, a component and subassembly manufacturing phase 108 and a system integration phase 110 of aircraft 120 may take place. Thereafter, aircraft 120 may go through a certification and delivery phase 112 to be placed into in-service phase 114. While in service (e.g., by an operator), aircraft 120 can be scheduled for routine maintenance and service 116 (which can also include modification, reconfiguration, refurbishment, and so on of one or more systems of aircraft 120). While the examples described herein relate generally to component and subassembly manufacturing phase 108 of aircraft 120, they can be practiced at other stages of method 100.

Each of the processes of method 100 can be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIGS. 2-3, aircraft 120 produced by illustrative method 100 can include a frame 122 with a plurality of systems 124 and an interior 126. Examples of plurality of systems 124 include one or more of a propulsion system 128, an electrical system 130, a hydraulic system 132, an environmental system 134, a cargo system 136, and a landing system 138. Each system can comprise various subsystems, such as controllers, processors, actuators, effectors, motors, generators, etc., depending on the functionality involved. Any number of other systems can be included. Although an aerospace example is shown, the principles disclosed herein can be applied to other industries, such as the automotive industry, rail transport industry, and nautical transport industry. Accordingly, in addition to aircraft 120, the principles disclosed herein can apply to other structures, such as other vehicles, e.g., land vehicles, marine vehicles, etc.

Apparatuses and methods shown or described herein can be employed during any one or more of the stages of the manufacturing and service method 100. For example, components or subassemblies corresponding to component and subassembly manufacturing phase 108 can be fabricated or manufactured in a manner suitable for components or subassemblies used while aircraft 120 is operating during in-service phase 114. Also, one or more examples of the apparatuses, methods, or combinations thereof can be utilized during production stages 108 and 110, for example, by substantially expediting assembly of or reducing the cost to manufacture or use aircraft 120. Similarly, one or more examples of the apparatus or method realizations, or a combination thereof, can be utilized, for example and without limitation, during maintenance and service phase 116.

Figure 4:
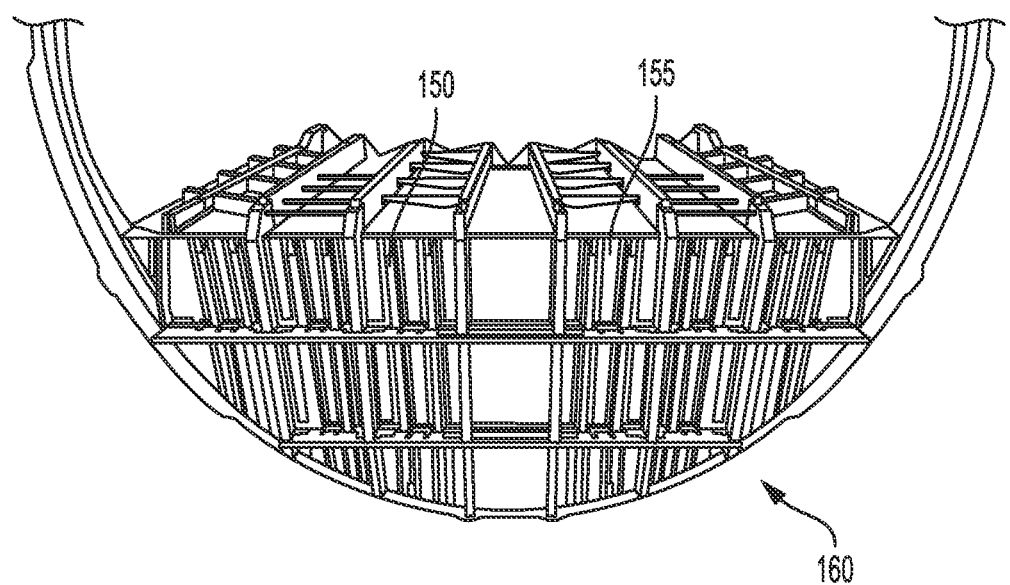
FIG. 4 is a back perspective view of a portion of an illustrative aircraft bulkhead including illustrative stiffeners.
Figure 5:
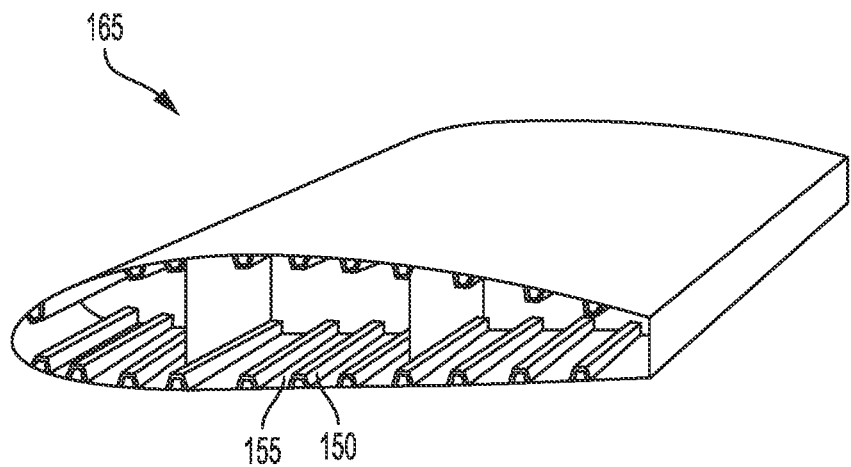
FIG. 5 is a perspective view of a portion of an illustrative aircraft wing including stiffeners.

As shown in FIGS. 3-5, aircraft 120 can include one or more stiffeners 150 configured to carry loads. In some examples, stiffeners 150 are attached to skins 155 to improve the strength, stiffness, and/or buckling resistance of the skins. Stiffeners 150 can be included in any suitable part of aircraft frame 122 and/or any other suitable part of aircraft 120. FIGS. 3-4 depict stiffeners 150 reinforcing skin 155 in an illustrative aircraft bulkhead 160. FIG. 5 depicts stiffeners 150 reinforcing skin 155 in an illustrative aircraft wing 165.

B. Illustrative Aircraft Stiffener

Figure 6:
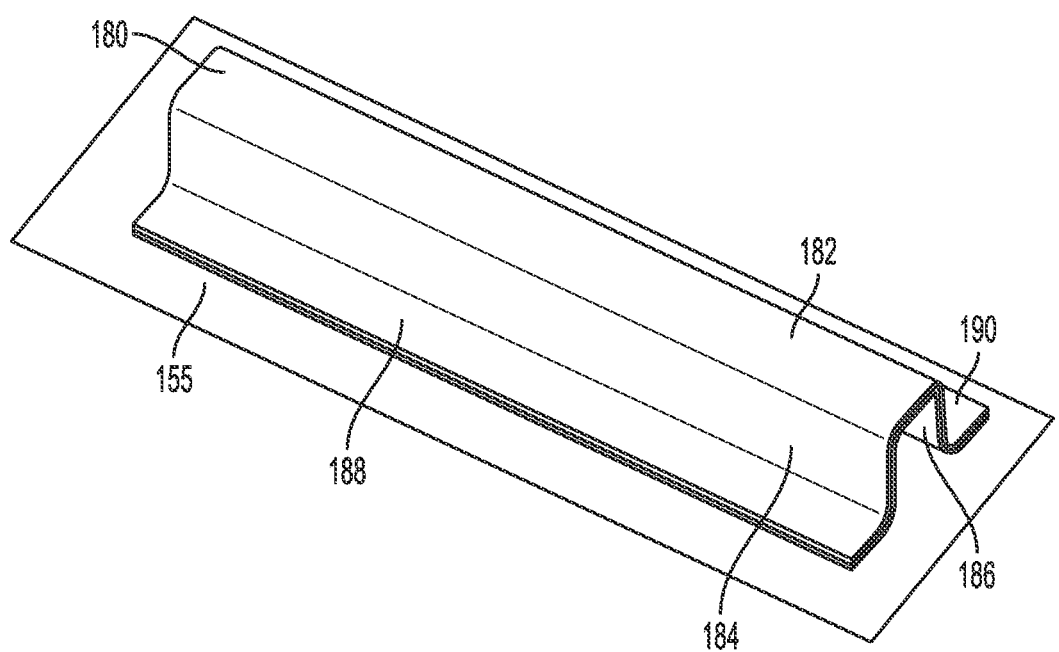
FIG. 6 is a perspective view of an illustrative composite aircraft hat stiffener attached to a skin.
Figure 7:
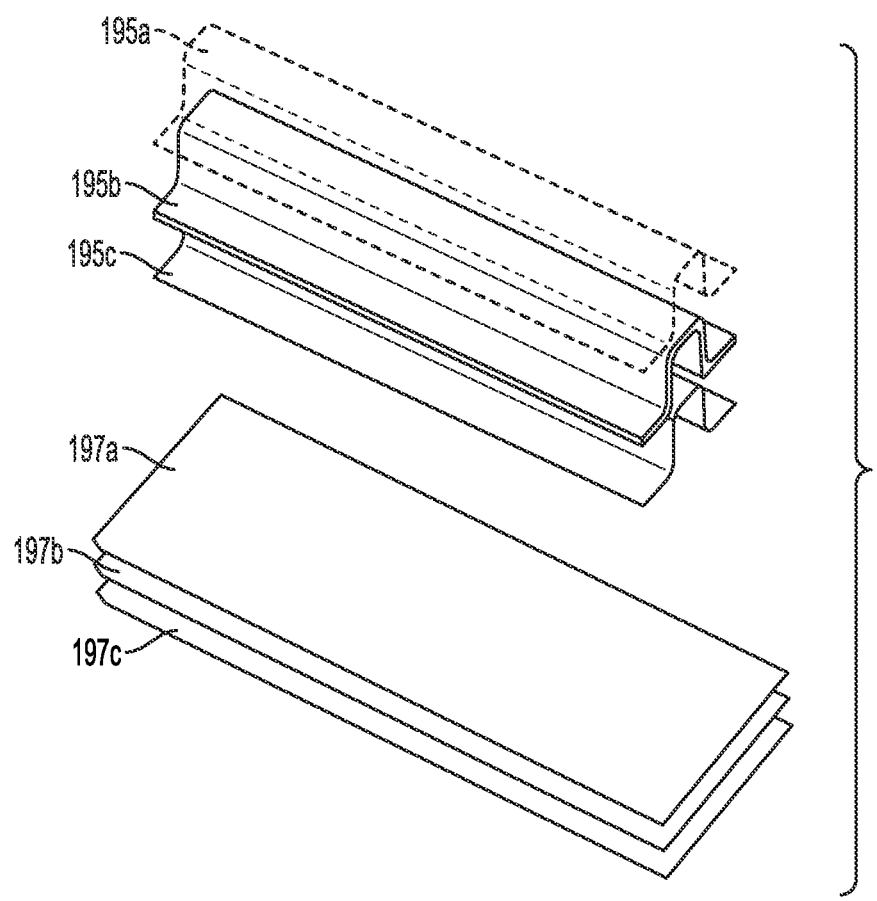
FIG. 7 is an exploded isometric view of the stiffener and skin of FIG. 6.

This section describes illustrative hat stiffener 180, as shown in FIGS. 6-7. Hat stiffener 180 is an example of stiffener 150, described above.

As depicted in FIG. 6, hat stiffener 180 includes a cap section 182 and first and second sidewalls 184 and 186 extending from opposing side portions of the cap section. In the example depicted in FIG. 6, first and second sidewalls 184 and 186 extend from cap section 182 at obtuse angles; in other examples, first and second sidewalls 184 and 186 can form acute angles or substantially right angles with cap section 182. The angle between cap section 182 and first sidewall 184 may or may not be equal to the angle between cap section 182 and second sidewall 186. Cap section 182 can be substantially planar, as depicted in FIG. 6, or can include curved and/or angled portions.

Hat stiffener 180 further includes first flange 188 extending from first sidewall 184, and second flange 190 extending from second sidewall 186. First and second flanges 188 and 190 extend away from each other in opposing directions and can be parallel to cap section 182 (e.g., the first and second flanges can be coplanar and can define a plane that is parallel to a plane generally defined by the cap section). First and second flanges 188 and 190 have respective bottom surfaces distal cap section 182. The bottom surfaces of the flanges can be attached to skin 155 such that hat stiffener 180 reinforces the skin. A plurality of hat stiffeners 180 can be attached to an expanse of skin 155.

Hat stiffener 180 is a composite part comprising one or more composite layers (also called plies) that are adhered together by curing (e.g., by application of heat and/or pressure). Skin 155 can also be a composite part comprising one or more composite layers. FIG. 7 is an exploded view depicting illustrative composite stiffener layers 195a, 195b, and 195c of hat stiffener 180 and illustrative composite skin layers 197a, 197b, and 197c of skin 155. Alternatively, hat stiffener 180 and/or skin 155 can comprise more composite layers, or fewer composite layers, than are depicted in FIG. 7.

Figure 8:
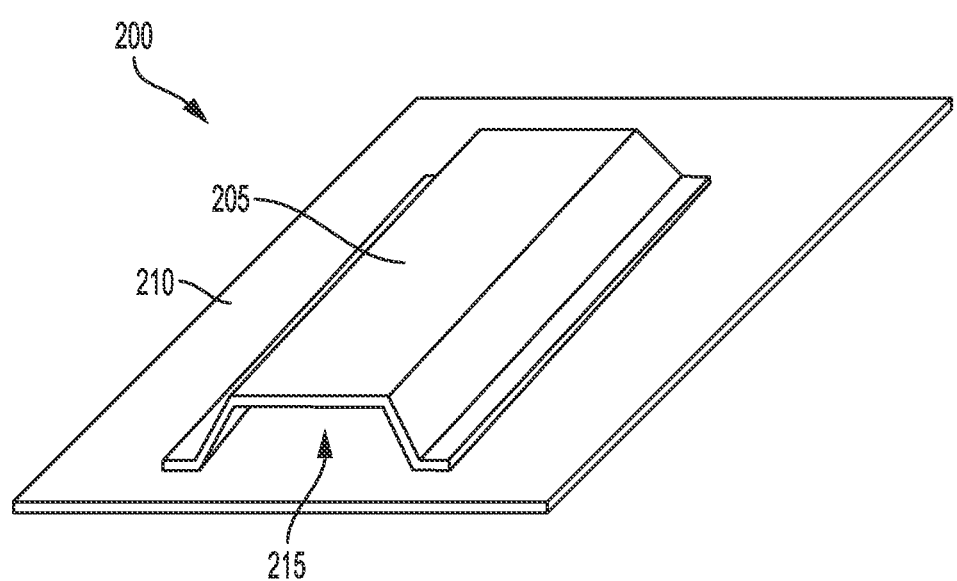
FIG. 8 is an isometric view of an illustrative workpiece assembly including a stiffener workpiece and a skin workpiece to be co-cured.

Hat stiffener 180 can be attached to skin 155 by curing the stiffener and the skin while they are held together. FIG. 8 schematically depicts a workpiece assembly 200 comprising a first workpiece 205 and a second workpiece 210. Workpiece assembly 200 has a cavity 215 formed by the combination of the first and second workpieces. As described above, an expandable first element can be inserted into cavity 215 to apply positive pressure to inner surfaces of the cavity, such that workpiece assembly 200 achieves a desired shape when cured.

In the example depicted in FIG. 8, first workpiece 205 is a stiffener workpiece that can be cured to produce a stiffener, such as hat stiffener 180, and second workpiece 210 is a skin workpiece that can be cured to produce skin 155 and/or another suitable expanse. First and second workpieces 205 and 210 can each comprise one or more composite layers that are cured during the curing process. Curing workpiece assembly 200 causes first and second workpieces 205 and 210 to be bonded together, producing a composite part that comprises a stiffener (e.g., hat stiffener 180) bonded to a skin (e.g., skin 155). In this example, the process of curing workpiece assembly 200 may be referred to as co-curing first workpiece 205 with second workpiece 210. Workpiece assembly 200 can also be formed by a single workpiece or more than two workpieces. In other examples, hat stiffener 180 and skin 155 are cured separately and bonded together at a later time.

Hat stiffener 180 and skin 155 can each comprise one or more polymer materials, thermoplastic materials, thermosetting materials, and/or any other suitable materials.

C. Illustrative Alternative Aircraft Stiffener

Figure 9:
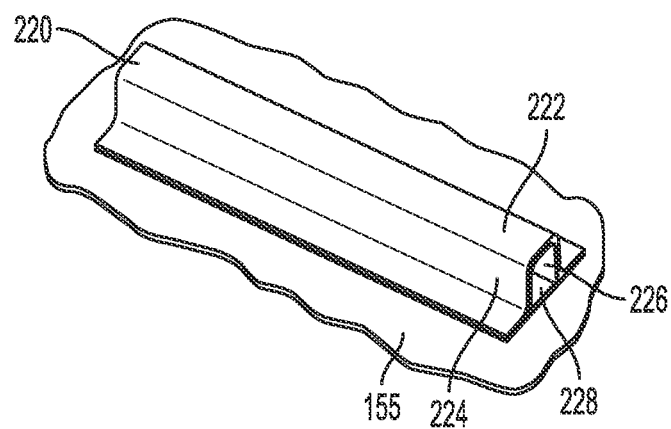
FIG. 9 is an isometric view of an illustrative alternative stiffener disposed on a skin.
Figure 10:
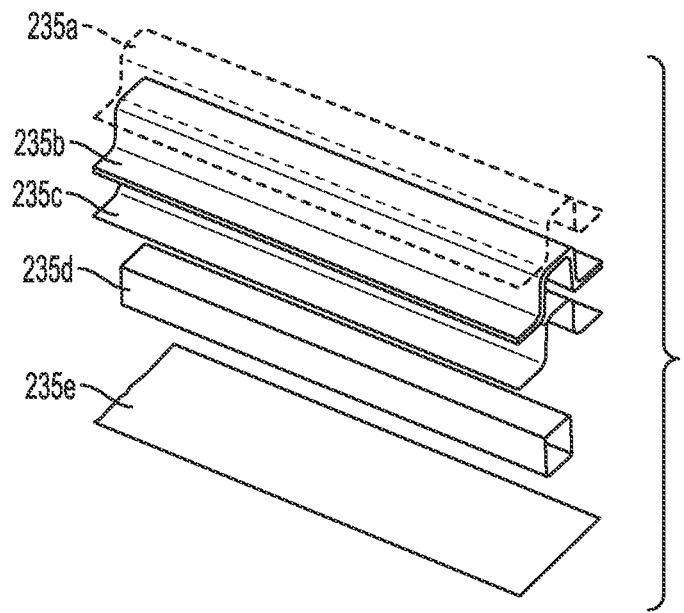
FIG. 10 is an exploded isometric view of the alternative stiffener of FIG. 9.
Figure 11:
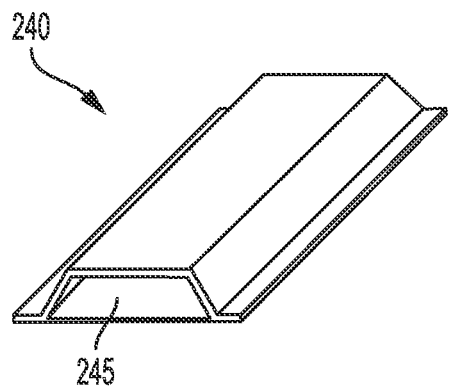
FIG. 11 is an isometric view of an illustrative alternative workpiece assembly including an alternative stiffener workpiece.

This section describes an illustrative alternative hat stiffener 220, as shown in FIGS. 9-11. Alternative hat stiffener 220 is an example of stiffener 150, described above.

As depicted in FIG. 9, alternative hat stiffener 220 includes an alternative cap section 222 and first and second alternative sidewalls 224 and 226 extending from opposing side portions of the alternative cap section to a same base section 228. Base section 228 is a substantially planar section supporting first and second alternative sidewalls 224 and 226. A bottom surface of base section 228 distal alternative cap section 222 can be bonded to skin 155 such that alternative hat stiffener 220 reinforces the skin. A plurality of alternative hat stiffeners 220 can be attached to an expanse of skin 155.

Alternative sidewalls 224 and 226 can each form any suitable angle with alternative cap section 222. Alternative cap section 222 can be substantially planar or can include curved and/or angled portions.

Alternative hat stiffener 220 is a composite part comprising one or more composite layers that are cured together (e.g., by application of heat and/or pressure) to form a single rigid structure. FIG. 10 is an exploded view depicting illustrative composite stiffener layers 235a, 235b, 235c, 235d, and 235e. In other examples, alternative hat stiffener 220 can comprise more layers or fewer layers than are depicted in FIG. 10.

Alternative hat stiffener 220 can comprise one or more polymer materials, thermoplastic materials, thermosetting materials, and/or any other suitable materials.

FIG. 11 schematically depicts an alternative workpiece assembly 240 that can be cured to produce alternative hat stiffener 220. Alternative workpiece assembly 240 has a cavity 245, as described above. An expandable first element can be inserted into the cavity of the alternative workpiece assembly to apply positive pressure to inner surfaces of the cavity, such that the alternative workpiece assembly achieves a desired shape when cured. Alternative workpiece assembly 240 can comprise one or more composite layers and/or a combination of workpieces that are cured during the curing process.

Alternative workpiece assembly 240 can be cured separately from skin 155 to form alternative hat stiffener 220, and the alternative hat stiffener can be bonded to the skin at a later time, such as during a second curing process. Alternatively, alternative workpiece assembly 240 can be co-cured with skin 155.

D. Expandable First Element

Figure 12:
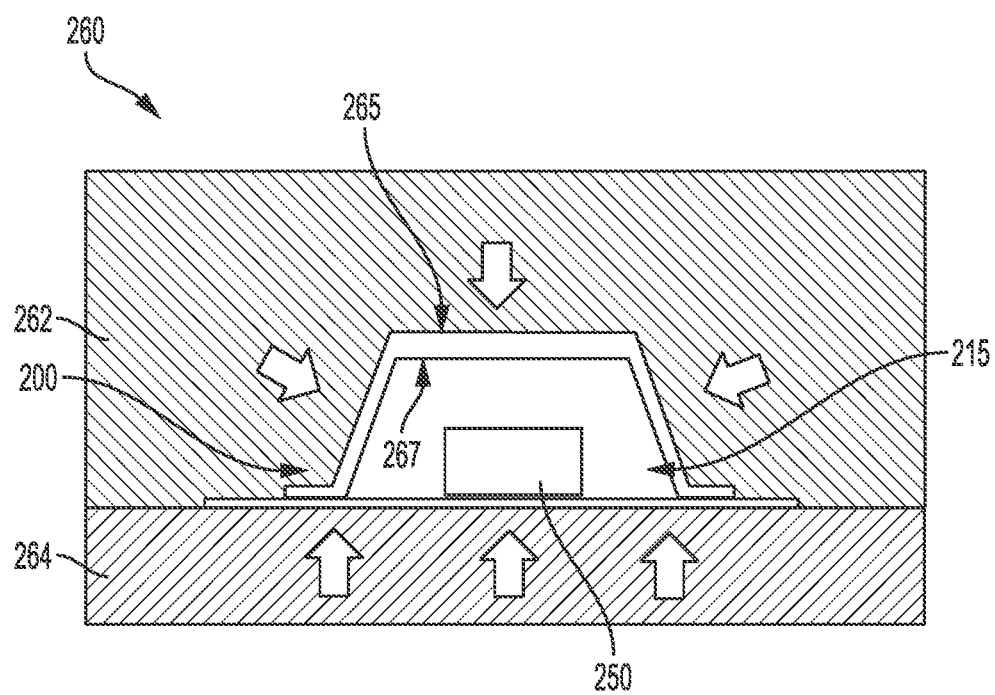
FIG. 12 is a schematic diagram depicting an unexpanded illustrative expandable element within a cavity of the workpiece assembly of FIG. 8.
Figure 13:
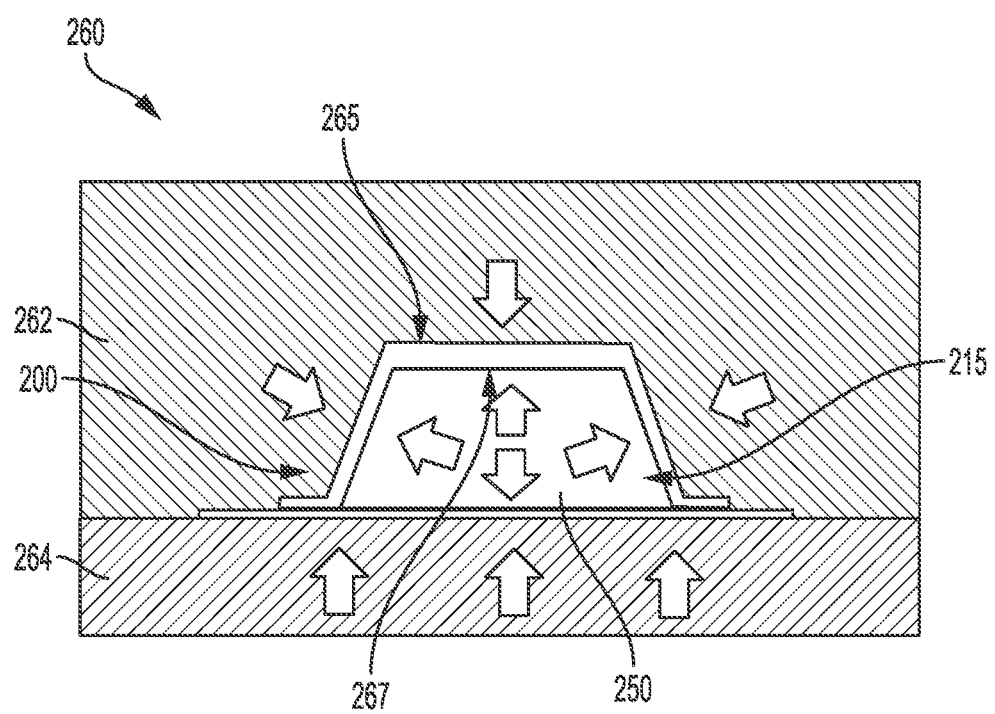
FIG. 13 is a schematic diagram depicting the illustrative expandable element of FIG. 12 in an expanded state within the cavity.

As shown in FIGS. 12-13, this section describes an illustrative expandable first element 250. Expandable first element 250 is an example of an expandable first element as described above.

FIG. 12 schematically depicts workpiece assembly 200 disposed within an illustrative mold 260. Mold 260 is configured to retain and/or press workpiece assembly 200 between first and second mold members 262 and 264 to facilitate curing of the workpiece assembly. Pressing workpiece assembly 200 between first and second mold members 262 and 264 typically includes applying pressure and/or a rigid surface to one or more outer surfaces 265 of the workpiece assembly, as indicated by arrows in FIG. 12. Cavity 215 can be partially formed by a surface of mold 260. The pressure and/or heat applied during curing may tend to collapse cavity 215, deforming workpiece assembly 200. To prevent this problem, expandable first element 250 can be inserted into cavity 215 prior to curing.

Typically, expandable first element 250 is inserted into cavity 215 while the expandable first element is in an unexpanded state, as shown in FIG. 12. Prior to and/or during the curing process, expandable first element 250 is made to expand (e.g., to increase in volume) to at least partially fill cavity 215, such that the expanded expandable first element applies positive pressure directly or indirectly to at least some inner surfaces 267 of workpiece assembly 200 forming cavity 215. As shown schematically in FIG. 13, the pressure applied by expanded expandable first element 250 from within cavity 215 tends to prevent workpiece assembly 200 from deforming during curing.

Expandable first element 250 is configured to expand (e.g., to a predetermined volume and/or pressure) when a predetermined change is produced in an attribute of the unexpanded first element. Typically, expandable first element 250 is inserted into cavity 215 in an unexpanded state, the predetermined change is produced in the attribute of the unexpanded first element while the unexpanded first element is within the cavity, and the unexpanded first element expands in response to the produced predetermined change. The attribute of expandable first element 250 can be a physical and/or chemical attribute. The attribute can, for example, be the temperature of expandable first element 250 and/or the temperature of one or more portions of the expandable first element. Accordingly, producing the predetermined change in the attribute of expandable first element 250 can include raising the temperature of the unexpanded expandable first element from a lower temperature, such as an ambient temperature (e.g., room temperature), to at least a predetermined temperature greater than the initial or ambient temperature (e.g., the predetermined temperature is a number of degrees above the ambient temperature suitable to produce a predetermined expansion of the first element). The expandable first element undergoes thermal expansion as a result of the increase in temperature.

The attribute of expandable first element 250 can be an internal volume and/or pressure, a saturation by one or more materials that are expandable with a change in the attribute, a magnetization or other suitable magnetic property, a voltage, an electric polarization, and/or any other suitable property. The attribute can be a combination of two or more properties of expandable first element 250, such as a ratio or a product of quantitative values associated with properties of the expandable first element, such as two materials that have different coefficients of thermal expansion.

The process of curing workpiece assembly 200 can include producing the predetermined change in the attribute of expandable first element 250. Therefore, the expansion of expandable first element 250 can occur automatically during the curing process. For example, the attribute can be a temperature of expandable first element 250, and heat applied to workpiece assembly 200 during the curing process can produce the predetermined change in the temperature of the expandable first element. That is, heat applied to workpiece assembly 200 during the curing process can raise the temperature of expandable first element 250 to at least a predetermined temperature associated with a desired volume and/or desired increase in volume. One or more properties of expandable first element 250 can be designed such that the temperature change induced in the expandable first element during the curing of workpiece assembly 200 causes the expandable first element to expand a desired predetermined amount as a result of thermal expansion. Alternatively, or additionally, causing expandable first element 250 to expand can require additional steps beyond those required to cure workpiece assembly 200. For example, causing expandable first element 250 to expand can include applying an electric field, injecting a liquid, gas, and/or another suitable material, and/or inducing any other suitable change in the expandable first element.

Typically, expanded expandable first element 250 is removed from cavity 215 after workpiece assembly 200 has been cured. To facilitate removal, expandable first element 250 can be configured to be easily separated from workpiece assembly 200 and/or mold 260 (e.g., the expandable first element can be configured not to stick to the workpiece assembly and/or the mold). Removing expandable first element 250 from cavity 215 can include changing the shape and/or size of the expanded expandable first element, such that the expandable first element can be extracted via an opening of the cavity. For example, expandable first element 250 can be cooled after workpiece assembly 200 is cured so that the expandable first element shrinks in volume. Shrinking expandable first element 250 can facilitate removal of the expandable first element from cavity 215; for example, the first element may be too large to fit through an opening of the cavity prior to shrinking, but small enough to fit through the opening after shrinking.

E. Illustrative Expandable Elements and Associated Systems

As shown in FIGS. 14-31, this section describes illustrative expandable elements, such as expandable pellets 300. Expandable pellets 300 are an example of expandable first element 250, described above. Expandable first element 250 can include a plurality of expandable pellets 300 configured to expand (e.g., to respective predetermined pellet volumes) in response to a predetermined change in an attribute of the expandable pellets. For example, expandable pellets 300 can be configured to expand when heated to at least a predetermined temperature.

Expandable pellets 300 can be foamable pellets configured to foam when heated to at least a predetermined foaming temperature. For example, expandable pellets 300 can comprise a thermoplastic material, a thermosetting material, and/or any other suitable polymer material, and can include a blowing agent 302 (see FIG. 14). Blowing agent 302 can comprise a foaming agent. Typically, blowing agent 302 is configured to, when heated to at least a predetermined temperature, form a plurality of holes, pockets, or voids within the material of expandable pellet 300, such that the volume of the pellet increases. For example, blowing agent 302 can be an inert gas that is permeated into the pellets under pressure. Such a blowing agent can be configured to expand in a plurality of locations within expandable pellet 300 when the temperature of the pellet is increased from an ambient or initial temperature to a predetermined higher temperature, and the expanded gas forms holes, pockets, or voids within the pellet. Blowing agent 302, if present, is applied to expandable pellets 300 prior to heating.

Figure 14:
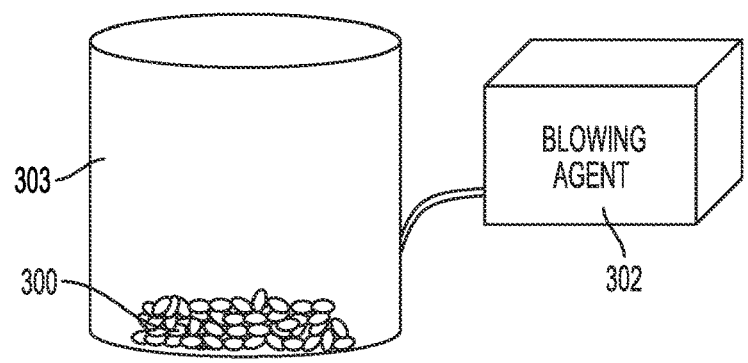
FIG. 14 is a schematic diagram depicting a blowing agent being applied to illustrative expandable pellets, the expandable pellets being an example of the expandable element of FIGS. 12-13.

Blowing agent 302 can be, e.g., a gas or liquid, such as carbon dioxide, nitrogen, one or more hydrocarbons, water, and/or any other suitable physical and/or chemical blowing agent. FIG. 14 schematically depicts expandable pellets 300 disposed within a vessel 303 in communication with a source of gas or liquid blowing agent 302. Blowing agent 302 flows into vessel 303, preferably under pressure when the blowing agent is a gas, and diffuses into expandable pellets 300 to render the pellets foamable. Alternatively, or additionally, blowing agent 302 can comprise one or more expandable gas-filled microspheres that are embedded in expandable pellets 300 when the pellets are formed. Suitable microspheres can include the expandable thermoplastic microspheres sold by AkzoNobel, Inc. of Chicago, Ill. under the proprietary name Expancel®.

Figure 15:
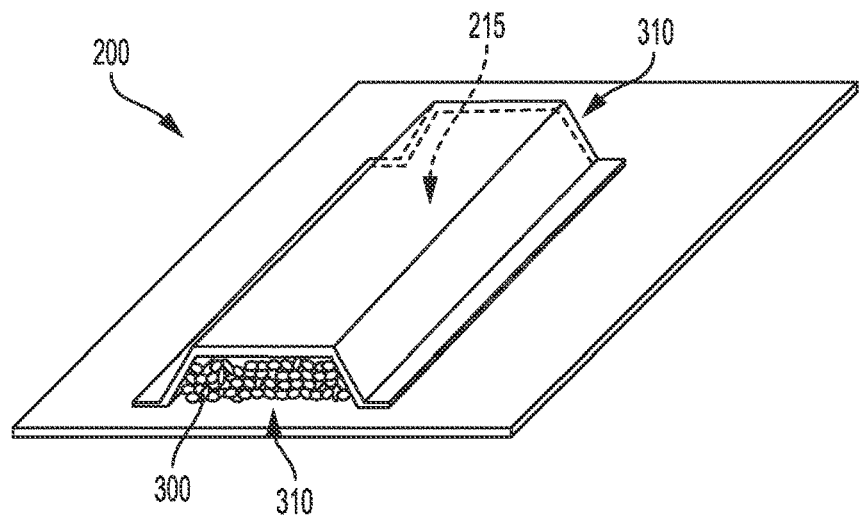
FIG. 15 is a schematic diagram illustrating the expandable pellets of FIG. 14 in an unexpanded state within a cavity of the workpiece assembly of FIG. 8.

As shown in FIG. 15, expandable pellets 300 are placed within cavity 215 while the expandable pellets are in an unexpanded state. Typically, cavity 215 includes one or more openings 310, and expandable pellets 300 are inserted into the cavity through the openings. The quantity of expandable pellets 300 placed within cavity 215 can include any number of pellets suitable, when expanded, to apply a positive pressure to the surfaces forming cavity 215 of workpiece assembly 200 sufficient to retain the shape of the workpiece assembly during the curing process. The number of expandable pellets 300 within cavity 215 can, for example, be fewer than 10, or between 10 and 100, or between 100 and 500, or between 500 and 1000, or greater than 1000, depending on the application and workpiece assembly. Typically, a length of each expandable pellet 300 is less than one centimeter. Expandable pellets 300 can be substantially uniform in size, or can include pellets of different sizes. In either case, expandable pellets 300 can each have a maximum dimension that is less than $\frac{1}{10}$ of a maximum cross-sectional dimension of cavity 215, which can allow the pellets to conform readily to the shape of the cavity.

Figure 16:
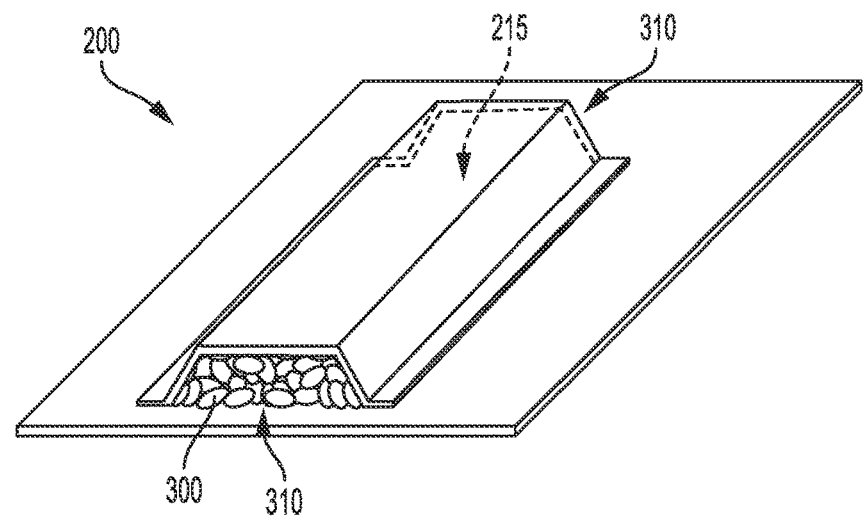
FIG. 16 is a schematic diagram illustrating the expandable pellets of FIG. 15 in an expanded state within the cavity.

During the process of curing workpiece assembly 200, expandable pellets 300 are made to expand from an unexpanded state to an expanded state. As described above, expandable pellets 300 can be configured to expand in response to heat applied to workpiece assembly 200 during curing. Expandable pellets 300 expand to at least partially fill cavity 215, such that the expanded expandable pellets apply positive pressure to workpiece assembly 200 as the workpiece assembly is cured. FIG. 16 depicts expandable pellets 300 in an expanded state within cavity 215.

Figure 17:
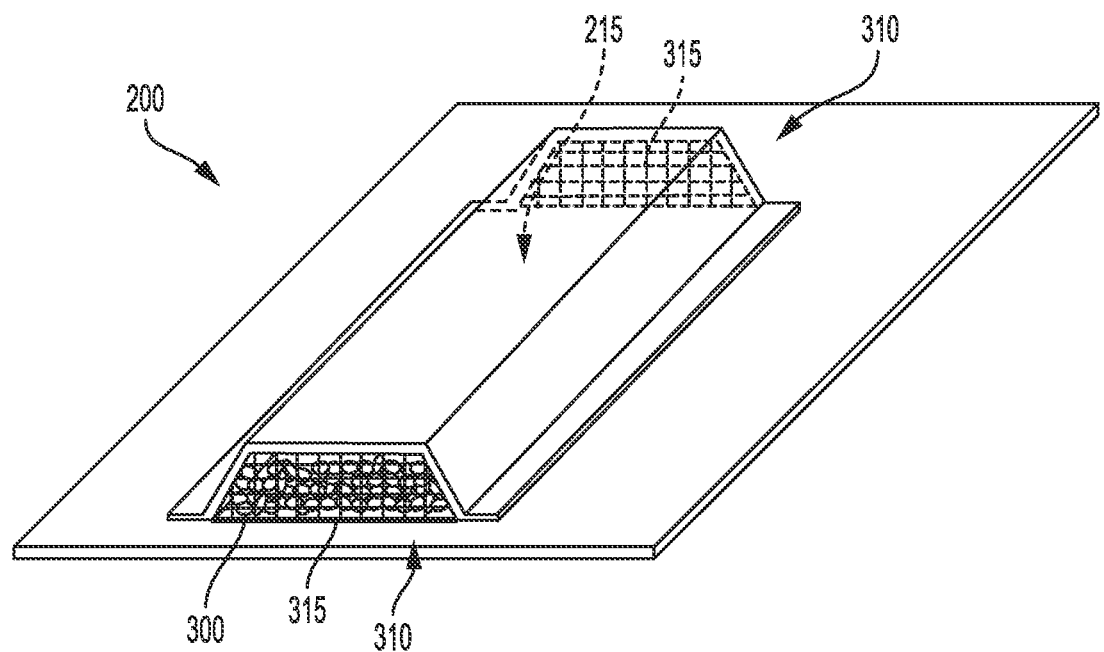
FIG. 17 is a schematic diagram illustrating the workpiece assembly cavity closed by an illustrative screen.

Prior to curing workpiece assembly 200, openings 310 of cavity 215 can be closed so that expandable pellets 300 are retained within the cavity as they expand during the curing process. FIG. 17 depicts an illustrative screen 315 comprising a grid disposed at openings 310 and configured to prevent egress of expandable pellets 300. Screen 315 is an example of a closure mechanism configured to close openings 310.

Expandable pellets 300 can be at least partially deformable after, during, and/or before expansion. A degree of deformability allows expandable pellets 300 to squeeze into small gaps that might otherwise exist between pellets, between pellets and inner surfaces 267, and/or between pellets and mold 260. Filling these gaps allows the ensemble of expandable pellets 300 to present a substantially smooth surface to inner surfaces 267.

Figure 18:
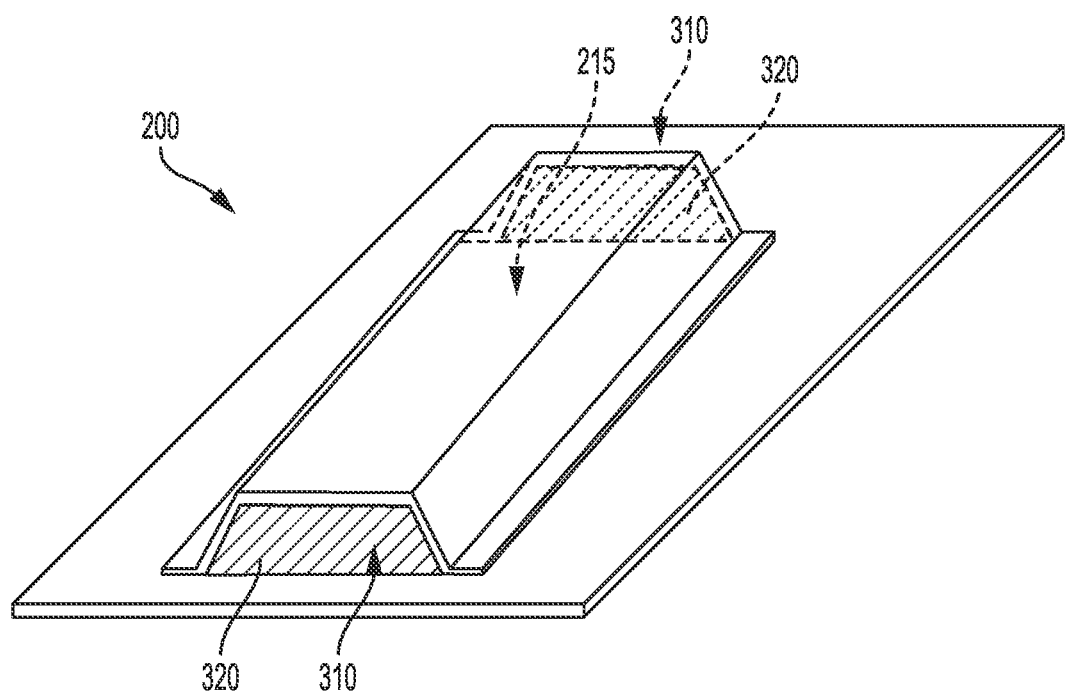
FIG. 18 is a schematic diagram illustrating the workpiece assembly with the cavity sealed.

Openings 310 can be sealed after being closed. FIG. 18 schematically depicts openings 310 sealed with seals 320. Sealing openings 310 can include rendering the openings watertight and/or airtight. Sealing openings 310, like closing the openings, retains expandable pellets 300 within cavity 215 as the pellets expand. However, sealing openings 310 may reduce the transfer of heat or matter (including moisture) into and/or out of cavity 215 to a greater extent than does closing the openings without sealing them. Seals 320 also allow the pressurization of cavity 215.

After workpiece assembly 200 has been cured, openings 310 are unsealed and/or opened as needed, and expandable pellets 300 are removed from cavity 215. Expandable pellets 300 can be configured to shrink when cooled, facilitating removal from the cavity. Alternatively, expandable pellets 300 can remain expanded and tightly packed together after workpiece assembly 200 has been cured and cooled, which may tend to impede their removal. The following paragraphs describe systems, methods, and apparatuses configured to facilitate removal of expandable pellets 300 from cavity 215.

a. Contractible Second Element

A contractible second element 350 (see FIGS. 19-23) can be inserted into the cavity along with expandable pellets 300. Typically, contractible second element 350 is configured to shrink when cooled from a heated curing temperature (e.g., a temperature achieved during curing of workpiece assembly 200) to an ambient temperature, or a temperature otherwise lower compared to curing temperatures. Contractible second element 350 is typically larger in volume than a single one of expandable pellets 300. For example, contractible second element 350 can have a volume between five times and ten times larger than a volume of one of expandable pellets 300, or a volume between ten times and twenty times larger than a volume of one of the pellets, or a volume more than twenty times larger than a volume of one of the pellets.

Figure 19:
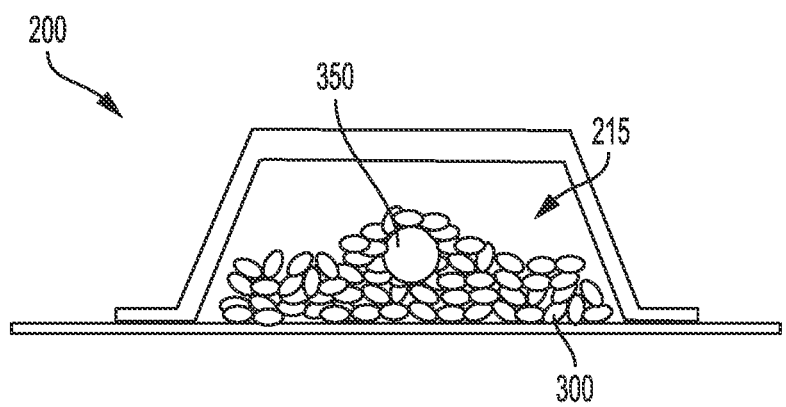
FIG. 19 is a schematic diagram illustrating an illustrative contractible element disposed with the expandable pellets in the cavity.

As shown schematically in FIG. 19, prior to curing workpiece assembly 200, contractible second element 350 and unexpanded expandable pellets 300 are inserted into cavity 215. The position of contractible second element 350 within cavity 215 is typically selected such that some expandable pellets 300 are disposed between the contractible second element and surfaces of workpiece assembly 200 during curing of the workpiece assembly. If contractible second element 350 were instead pushed against portions of workpiece assembly 200 during curing, the contractible second element may undesirably deform the workpiece assembly unless it is configured to conform to the cavity walls when expanded. Contractible second element 350 can provide a surface for expandable pellets 300 to push against as they expand, which may benefit the distribution of pressure throughout cavity 215 (e.g., by making the pressure distribution more uniform throughout the cavity, and/or within selected portions of the cavity).

Figure 20:
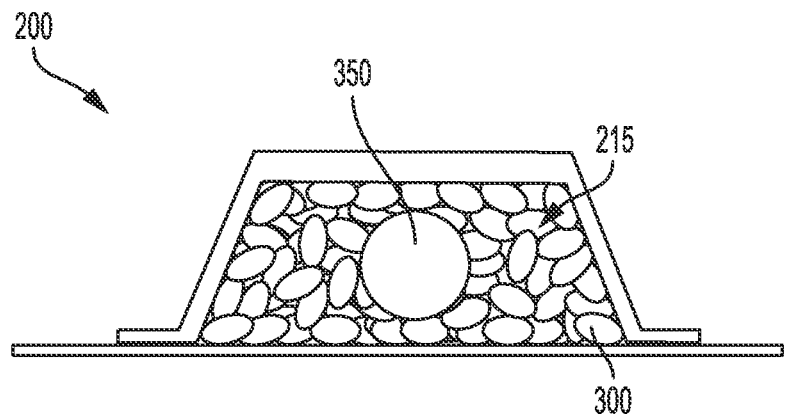
FIG. 20 is a schematic diagram illustrating the contractible element of FIG. 19 in an expanded state with expanded expandable pellets in the cavity.

FIG. 20 schematically depicts workpiece assembly 200 after curing and prior to cooling contractible second element 350, with expandable pellets 300 having expanded to push against the contractible second element and surfaces of the workpiece assembly. During and/or prior to curing of workpiece assembly 200, contractible second element 350 can help push expandable pellets 300 into edge portions, corners, crevices, pockets, and/or narrow portions of cavity 215. Contractible second element 350 may or may not be configured to expand during the curing process. FIG. 20 depicts an example in which contractible second element 350 expands during the curing process.

Figure 21:
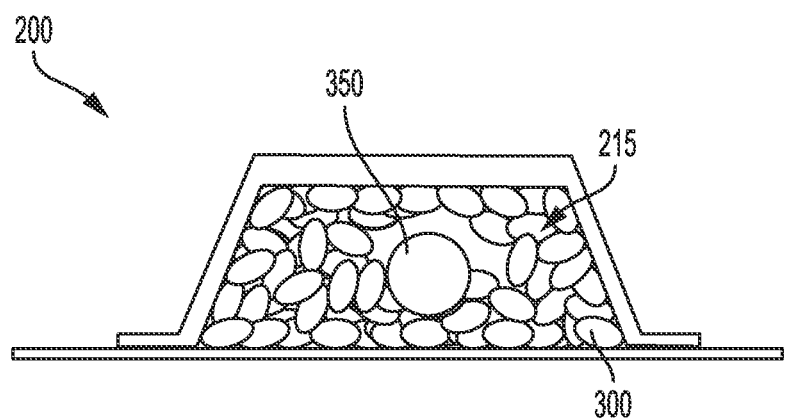
FIG. 21 is a schematic diagram illustrating the contractible element in a contracted state with the expanded expandable pellets in the cavity.
Figure 22:
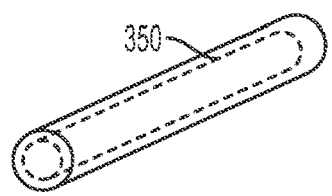
FIG. 22 is a schematic diagram illustrating an illustrative contractible rod.

FIG. 21 schematically depicts workpiece assembly 200 after curing and after contractible second element 350 has been shrunk (e.g., by cooling and/or deflation). In examples of second elements that shrink when cooled, shrinking contractible second element 350 can include cooling the contractible second element with a cooling mechanism (e.g., one or more fans, water chillers, thermoelectric coolers, etc.). Additionally, or alternatively, contractible second element 350 can be allowed to cool naturally toward an ambient temperature. Shrunken contractible second element 350 fits loosely within cavity 215 and/or within the plurality of expanded expandable pellets 300 within cavity 215, and therefore can be extracted from the cavity relatively easily. Typically, contractible second element 350 is removed from cavity 215, and then the tightly packed expandable pellets 300 are removed. Removing contractible second element 350 leaves space in cavity 215, allowing expandable pellets 300 to move more easily and therefore to be extracted more easily. Alternatively, contractible second element 350 and expandable pellets 300 can be removed substantially simultaneously, or at least some of the pellets can be removed prior to removal of the contractible second element.

External surfaces of contractible second element 350 can be configured to stick to expandable pellets 300, such that at least some of the expandable pellets are removed from the cavity along with the contractible second element when the contractible second element is removed from the cavity. For example, surfaces of contractible second element 350 can include one or more adhesives, high-friction materials, and/or shapes (e.g., ribbing, indentations, and/or relief patterns) configured to capture one or more expandable pellets 300 such that the captured pellets tend to move through cavity 215 along with the contractible second element.

Contractible second element 350 can include a solid material configured to contract when cooled from a heated curing temperature of the curing process to an ambient or other temperature lower than the curing temperature. For example, contractible second element 350 can include a metal material. In examples in which at least a portion of cavity 215 is elongate, such as when workpiece assembly 200 includes an aircraft stiffener workpiece, contractible second element 350 can comprise a metal rod positioned longitudinally within the cavity. In the example depicted in FIG. 22, contractible second element 350 comprises a solid or hollow (shown in dashed lines) rod having a circular cross-section. Additionally, or alternatively, contractible second element 350 can have a different cross-sectional shape, such as oblong, square, triangular, hexagonal, polygonal, and/or irregular. Contractible second element 350 can be a solid and/or hollow object having a spherical, planar, rectangular, conical, and/or irregular shape.

Figure 23:
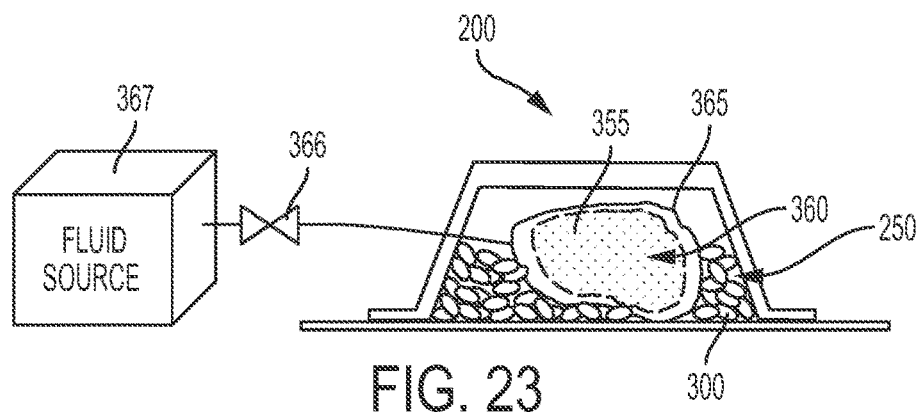
FIG. 23 is a schematic diagram illustrating an illustrative contractible bladder disposed in the cavity and in communication with a fluid source.

Additionally, or alternatively, contractible second element 350 can comprise a bladder 355 (see FIG. 23). Bladder 355 (also referred to as a balloon) contains a fluid 360 (e.g., one or more liquids and/or gases) configured to contract when cooled from the curing temperature to a lower ambient temperature. Fluid 360 is confined within one or more bladder walls 365 comprising an elastic material (e.g., silicone) configured to expand and contract as the fluid within expands and contracts, such that the volume of bladder 355 is reduced when cooled from the curing temperature to a lower or ambient temperature. The constituents of fluid 360 and/or bladder walls 365 can be selected to achieve a desired volume and/or pressure of bladder 355 at the temperatures associated with curing workpiece assembly 200. Bladder 355 can be used in conjunction with expandable pellets 300 in the manner illustrated in FIGS. 19-21 and associated description above.

Bladder 355 can be configured to be opened to allow egress of fluid 360, reducing the volume of the bladder and thereby facilitating removal of the bladder from cavity 215. For example, bladder 355 can be coupled to a valve 366 configured to be closed to retain fluid 360 within the bladder or opened to allow fluid 360 to exit the bladder. Bladder 355 can be deflated by puncturing one or more walls 365. In examples in which bladder 355 is deflated by puncturing, the bladder can be disposable, and/or can be repairable for reuse. Additionally, or alternatively, bladder 355 can be configured to contract in volume when cooled (e.g., when workpiece assembly 200 is cooled after curing).

Valve 366 can be configured to be in fluid communication with bladder 355 and a source 367 of fluid 360. Source 367 can include a reservoir for holding fluid 360 and/or a pump for pumping fluid 360 into or out of bladder 355. Valve 366 can be configured to permit fluid 360 to flow from source 367 into bladder 355, so that the bladder can be filled with a desired volume and/or pressure of the fluid. Adjusting the volume and/or pressure of fluid 360 within bladder 355 allows the pressure exerted by the bladder on adjacent portions of expandable first element 250, expandable pellets 300, and/or workpiece assembly 200 to be selectively adjusted without directly adjusting the temperature of the bladder or the fluid within the bladder.

Alternatively, bladder 355 and/or valve 366 can be configured not to be in fluid communication with source 367 during curing of workpiece assembly 200. For example, bladder 355 can be at least partially filled with fluid 360 and then disconnected from fluid source 367 prior to inserting the bladder into cavity 215. Alternatively, or additionally, bladder 355 can be inserted into cavity 215 and at least partially filled with fluid 360 while inside the cavity, and then disconnected from fluid source 367 prior to curing workpiece assembly 200.

Bladder 355 can be at least partially filled with a foaming agent configured to expand when heated or release a quantity of gas having sufficient pressure and/or volume to apply a predetermined pressure to inner surface 267 of cavity 215. Accordingly, bladder 355 can be an example of expandable first element 250, such as is illustrated in FIGS. 12 and 13.

b. Additional Pellets

Figure 24:
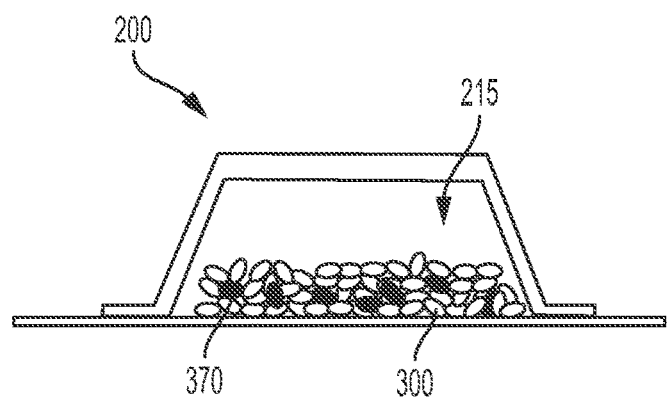
FIG. 24 is a schematic diagram illustrating illustrative additional pellets mixed with the expandable pellets in the cavity, with the expandable pellets in an unexpanded state.
Figures 25, 26:
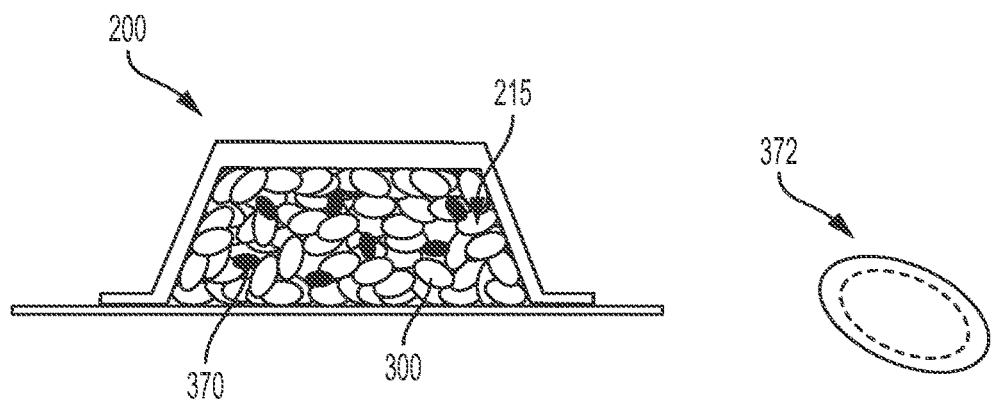
FIG. 25 is a schematic diagram illustrating the additional pellets of FIG. 24 mixed with the expandable pellets in the cavity, with the expandable pellets in an expanded state.
FIG. 26 is a schematic diagram illustrating an illustrative contractible pellet, which is an example of the contractible element.

FIGS. 24-25 depict a plurality of additional pellets 370 configured to expand less than expandable pellets 300 when heated to a predetermined temperature. Expanding less than expandable pellets 300 when heated to the predetermined temperature can include substantially not expanding when heated to the predetermined temperature (e.g., having substantially the same volume at the predetermined temperature as at an ambient temperature lower than the predetermined temperature.) For example, the additional pellets can have a coefficient of thermal expansion that is less than ten percent of a coefficient of thermal expansion of the expandable pellets.

A mixture of expandable pellets 300 and additional pellets 370 can be inserted into cavity 215, as depicted in FIG. 24. After workpiece assembly 200 has been cured, expandable pellets 300 are expanded, and additional pellets 370 are expanded to a lesser extent. In the example depicted in FIG. 25, additional pellets 370 are substantially unexpanded after workpiece assembly 200 has been cured.

Additional pellets 370 can comprise any suitable material configured to expand less than expandable pellets 300 when heated to the predetermined temperature. The additional pellets can have other differences from the expandable pellets that are beneficial, such as having a higher weight per unit volume or being magnetically attractable. For example, additional pellets 370 can comprise a glass material, a metal material, an alloy material, a plastic material, and/or any other material having suitable thermal expansion or other beneficial properties. Additional pellets 370 can be solid, hollow, and/or partially hollow. Additional pellets 370 comprising different materials, shapes, and/or dimensions can be mixed with expandable pellets 300.

Additional pellets 370 facilitate the extraction of expandable pellets 300 from cavity 215. For example, additional pellets 370 can be configured to separate easily from expandable pellets 300 Additional pellets 370 can comprise relatively smooth material (e.g., glass or steel) configured not to stick to expandable pellets 300 or to workpiece assembly 200. In examples in which expandable pellets 300 tend to sinter or fuse together, the presence of non-sintering additional pellets 370 can disrupt the formation of large blocks of sintered expandable pellets. These large blocks can be difficult to extract from cavity 215; for example, the large blocks may be too large to fit through openings 310.

Additional pellets 370 can comprise contractible additional pellets 372 configured to shrink when cooled from the heated curing temperature toward an ambient temperature (see FIG. 26 in which the uncontracted size of a representative contractible additional pellet is shown in solid line and the contracted additional pellet is shown in dashed line). Contractible additional pellets 372 are an example of contractible second element 350, described above. Contractible additional pellets 372 can comprise a suitable metal material, plastic material, and/or any other suitable material configured to shrink when cooled from the heated curing temperature toward the ambient temperature.

In examples in which additional pellets 370 are substantially rigid (e.g., non-deformable), the presence of the additional pellets mixed in with expandable pellets 300 can help to distribute pressure applied by the expanding expandable pellets throughout cavity 215.

c. Magnetically Attractable Bead Extraction System

Figure 27:
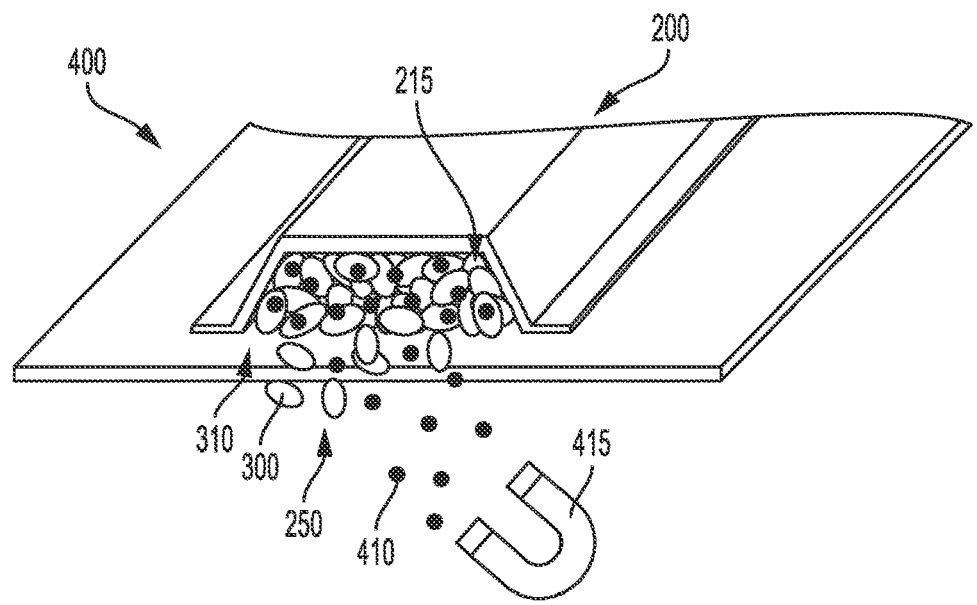
FIG. 27 is a schematic partial view of an illustrative magnetically attractable bead extraction system for extracting the expandable pellets from the cavity.

FIG. 27 depicts a magnetically attractable bead extraction system 400 configured to facilitate extraction of expandable pellets 300 from cavity 215. Magnetically attractable bead extraction system 400 comprises a plurality of magnetically attractable elements, such as magnetically attractable beads 410 and a complementary magnetically attractable element 415. In general, magnetically attractable beads 410 can comprise any material configured to be magnetically attracted to complementary magnetically attractable element 415, and complementary magnetically attractable element 415 can comprise any material configured to be magnetically attracted to magnetically attractable beads 410. In one example, magnetically attractable beads 410 are steel beads, and complementary magnetically attractable element 415 is a permanent magnet. In another example, magnetically attractable beads 410 are permanent magnets, and complementary magnetically attractable element 415 is a steel block. Additional illustrative examples are discussed below.

Magnetically attractable beads 410, as an example of additional pellets 370, can be mixed with expandable pellets 300, and the mixture of expandable pellets and magnetically attractable beads can be inserted into cavity 215 prior to curing workpiece assembly 200.

After workpiece assembly 200 has been cured, magnetically attractable beads 410 are extracted from cavity 215 by a magnetic force provided by at least one of magnetically attractable beads 410 and complementary magnetically attractable element 415. Because magnetically attractable beads 410 are distributed throughout the plurality of expandable pellets 300, at least some of the magnetically attractable beads that are moved through cavity 215 by the force between the beads and complementary magnetically attractable element 415 typically dislodge and/or push out of the cavity one or more of the expandable pellets. As magnetically attractable beads 410 and any accompanying expandable pellets 300 move through the cavity, they tend to break up subsets of expandable pellets that are stuck together or jammed together, facilitating extraction of the expandable pellets. After at least some magnetically attractable beads 410 and any accompanying expandable pellets 300 have exited cavity 215, the remaining expandable pellets have more room to move within the cavity and can be extracted more easily.

Magnetically attractable beads 410 can comprise any suitable material configured to be magnetically attracted to complementary magnetically attractable element 415, such as iron, cobalt, nickel, steel, ferrite, and/or any other suitable magnetic or ferromagnetic material. For example, magnetically attractable beads 410 can comprise permanent magnets. Magnetically attractable beads 410 can be configured to expand less than expandable pellets 300 when heated to a predetermined temperature, and can therefore be examples of additional pellets 370. Additionally, or alternatively, magnetically attractable beads 410 can be configured to shrink when cooled from a heated curing temperature toward an ambient temperature, in which case the magnetically attractable beads are examples of contractible additional pellets 372.

Complementary magnetically attractable element 415 can comprise any suitable material and/or apparatus configured to exert on magnetically attractable beads 410 an attractive magnetic force configured to extract the magnetically attractable beads from cavity 215. Complementary magnetically attractable element 415 can, for example, comprise one or more permanent magnets and/or electromagnets. Complementary magnetically attractable element 415 can be positioned external to cavity 215 when extracting magnetically attractable beads 410 from the cavity. For example, complementary magnetically attractable element 415 can be positioned near cavity opening 310 or be moved along the sides of the workpiece assembly. There can be a plurality of cavity openings 310 and a plurality of complementary magnetically attractable elements 415, and at least one of the complementary magnetically attractable elements can be positioned outside each cavity opening.

Additionally, or alternatively, complementary magnetically attractable element 415 can be moved between two or more positions external to cavity 215. For example, complementary magnetically attractable element 415 can first be positioned outside a central portion of cavity 215, and then moved toward opening 310. In this way, complementary magnetically attractable element 415 can draw one or more magnetically attractable beads 410 from a central portion of cavity 215 to cavity opening 310 and through the cavity opening. Complementary magnetically attractable element 415 can comprise one or more electromagnets disposed in fixed positions external to cavity 215, and a time-varying current produces a varying magnetic field in the one or more electromagnets configured to draw magnetically attractable beads 410 from central portions of the cavity toward opening 310.

Alternatively, or additionally, complementary magnetically attractable element 415 can be positioned within cavity 215. For example, after workpiece assembly 200 has been cured, complementary magnetically attractable element 415 can be inserted into cavity 215 and removed from the cavity along with at least some magnetically attractable beads 410. Inserting complementary magnetically attractable element 415 into cavity 215 can include removing and/or breaking some expandable pellets 300 to make space for the complementary magnetically attractable element in the cavity. Complementary magnetically attractable element 415 can be repetitively placed near the pellets and moved toward an opening to "sweep" the pellets out of the cavity progressively.

d. Pressurized Fluid Extraction System

Figure 28:
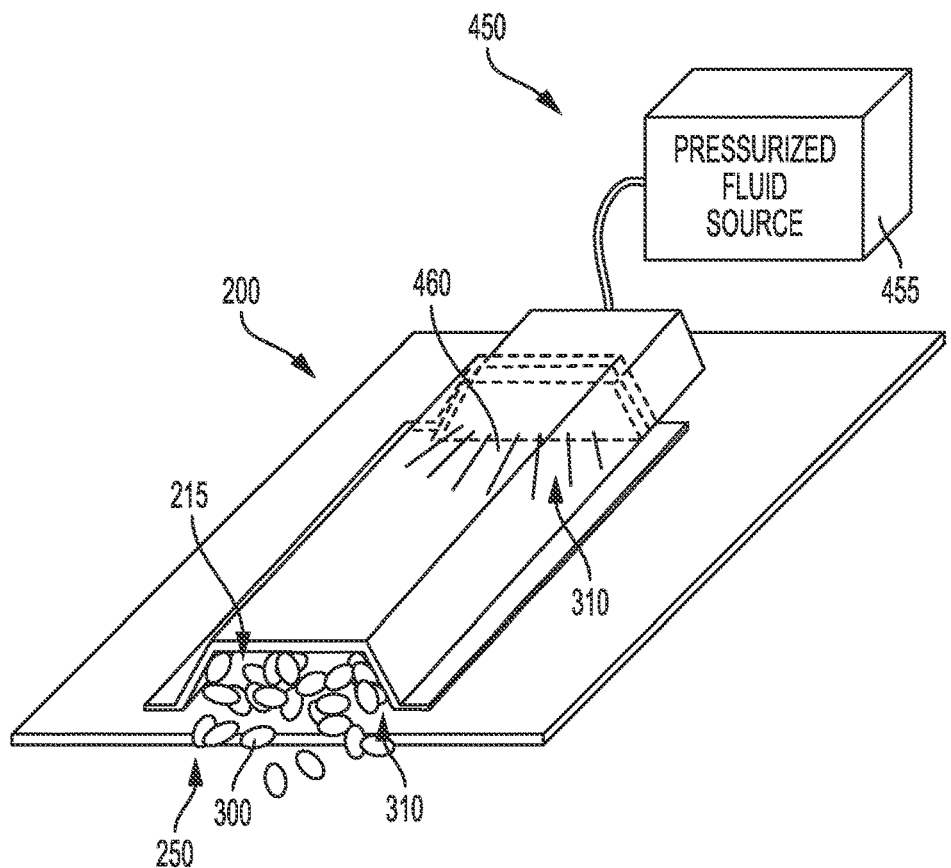
FIG. 28 is a schematic diagram of an illustrative pressurized fluid extraction system for extracting the expandable pellets from the cavity.

FIG. 28 depicts a pressurized fluid extraction system 450 configured to extract expandable first element 250 from cavity 215. Pressurized fluid extraction system 450 includes a pressurized fluid source 455 configured to force a pressurized fluid 460 into cavity 215 (e.g., through opening 310, or through another aperture in workpiece assembly 200). The force provided by pressurized fluid 460 pushes expandable first element 250 out of the cavity (e.g., through opening 310). If workpiece assembly 200 comprises an aircraft stiffener workpiece having two openings 310, pressurized fluid 460 can enter cavity 215 through a first one of the openings and expandable first element 250 can exit the cavity through a second one of the openings, as shown in FIG. 28.

If expandable first element 250 comprises a plurality of expandable pellets 300, as in the example depicted in FIG. 28, then pressurized fluid 460 can force apart groups of expandable pellets that are jammed together and/or at least partially sintered together, so that the expandable pellets can be expelled from cavity 215.

Pressurized fluid 460 can comprise any suitable fluid, such as inert gas, configured to be forced into cavity 215. Constituents of pressurized fluid 460 can be selected to be chemically non-reactive with the materials of workpiece assembly 200, mold 260, and/or expandable first element 250. Pressurized fluid 460 can comprise air, an inert molecular gas, an inert atomic gas, and/or any other suitable gas or liquid. Pressurized fluid source 455 can comprise a gas tank containing pressurized fluid 460 in the form of gas and configured to selectively emit the pressurized gas. Alternatively, or additionally, pressurized fluid source 455 can include a fan configured to cause ambient air or other gas to move in a selected general direction at a high flow rate.

e. Vacuum Extraction System

Figure 29:
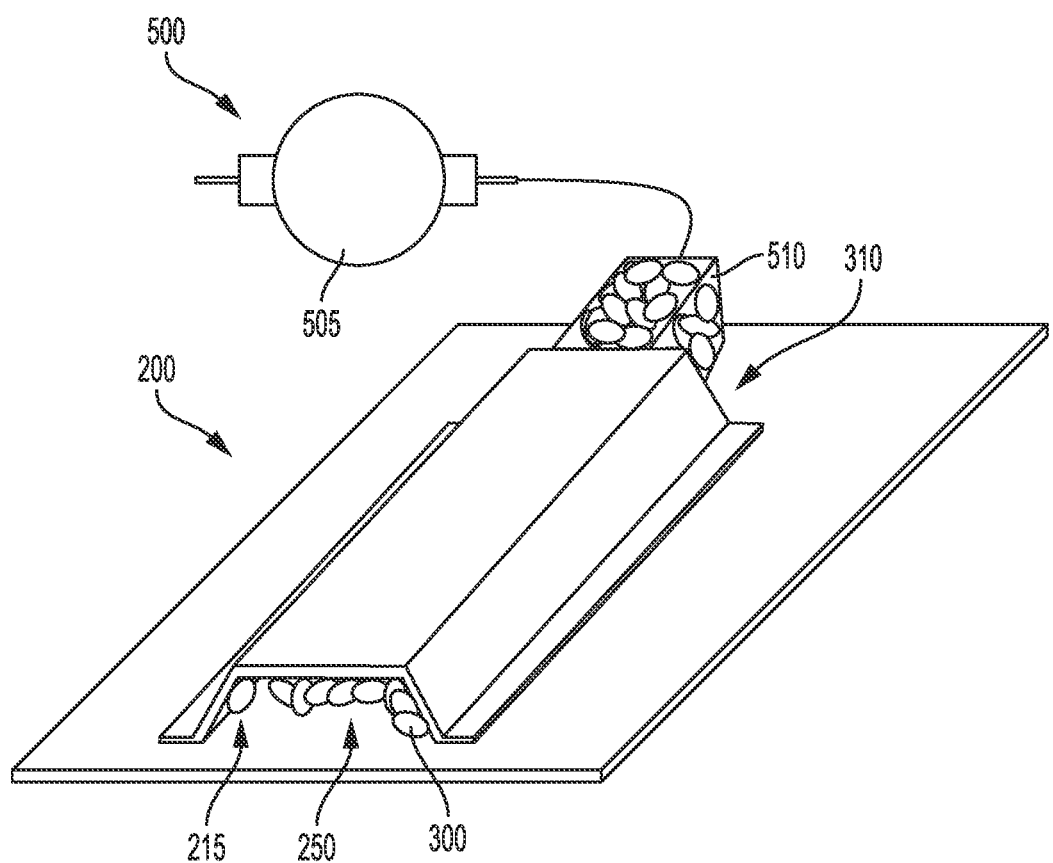
FIG. 29 is a schematic diagram of an illustrative vacuum extraction system for extracting the expandable pellets from the cavity.

FIG. 29 depicts a vacuum extraction system 500 configured to extract expandable first element 250 from cavity 215. Vacuum extraction system 500 comprises a vacuum source 505 configured to create a region of low gas pressure and/or partial vacuum adjacent opening 310 and/or another aperture of workpiece assembly 200, such that expandable first element 250 tends to move out of cavity 215. Vacuum extraction system 500 can further comprise a receptacle 510 configured to collect expandable first element 250 and/or portions thereof (e.g., one or more of expandable pellets 300) that are drawn out of cavity 215 by suction provided by vacuum source 505.

If expandable first element 250 comprises a plurality of expandable pellets 300, as in the example depicted in FIG. 29, then the force provided by vacuum source 505 can force apart groups of expandable pellets that are jammed together and/or at least partially sintered together, so that the expandable pellets can be extracted from cavity 215.

Vacuum source 505 can comprise one or more fans, vacuum pumps, and/or any other device configured to create a pressure differential sufficient to pull expandable first element 250 toward an opening 310 of cavity 215.

f. Expandable Pellets Configured for Extraction

As described above, expandable first element 250 can comprise a plurality of expandable pellets 300. Expandable pellets 300 can tend to sinter, stick, melt, and/or fuse together as they expand, forming larger blocks of material within cavity 215. For example, expandable pellets 300 configured to expand by foaming when heated to at least a predetermined foaming temperature may tend to sinter together as they expand. Blocks of fused pellet material can be difficult to extract from cavity 215. For example, they may be too large to fit through opening 310 and/or to be moved by one or more of the extraction systems described above. Expandable pellets 300 can therefore be formulated and/or treated after formulation to resist sintering, as described below.

Expandable pellets 300 can comprise at least an expandable component configured to expand when heated and at least a material configured to prevent the expandable pellets from sticking to each other, and/or from sticking to inner surface 267 of cavity 215. The component can comprise a foamable material, e.g., a thermoplastic material treated with a blowing agent; a gas-filled balloon; hollow microspheres, a metal; and/or any other suitable component configured to expand when heated. The material configured to prevent expandable pellets 300 from sticking to each other can comprise a non-stick material configured to facilitate separation of expandable pellets 300 from each other and/or from inner surface 267 after heating. For example, expandable pellets 300 can be made of ABS (acrylonitrile butadiene styrene) plastic.

Additionally, or alternatively, expandable pellets 300 can comprise material selected such that the uncoated expandable pellets sinter to each other or melt at a predetermined sinter temperature, and the predetermined sinter temperature is less than the expansion temperature to which the expandable pellets are heated during curing of workpiece assembly 200 (e.g., the temperature to which the expandable pellets are heated so that they expand within cavity 215).

Figure 30:
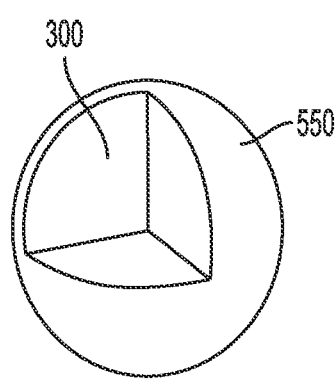
FIG. 30 is a schematic cutaway view of an illustrative expandable pellet coated in lubricant powder.

At least some of expandable pellets 300 can be coated with a lubricant 550 before they are heated. FIG. 30 depicts an expandable pellet 300 coated with lubricant 550. Lubricant 550 can be any powder, liquid, gel, solid, foam, and/or any other suitable material configured to prevent expandable pellets 300 from sticking together and/or sticking to inner surface 267 of cavity 215. For example, lubricant 550 can comprise polytetrafluoroethylene (PTFE) powder, PTFE nano-powder, silicone, perfluoropolyether (PFPE), perfluoroalkylether (PFAE), perfluoropolyalkylether (PFPAE), and/or the like. Lubricant 550 can be applied to expandable pellets 300 before the expandable pellets are inserted into cavity 215. Alternatively, or additionally, lubricant 550 can be applied to expandable pellets 300 while the expandable pellets are inside cavity 215. Coating at least some of expandable pellets 300 with lubricant 550 can include mixing the lubricant with the plurality of pellets and/or pouring the lubricant over the plurality of pellets. Additionally, or alternatively, at least a subset of the plurality of expandable pellets 300 can be coated with lubricant 550 and then mixed in with a plurality of uncoated pellets.

Figure 31:
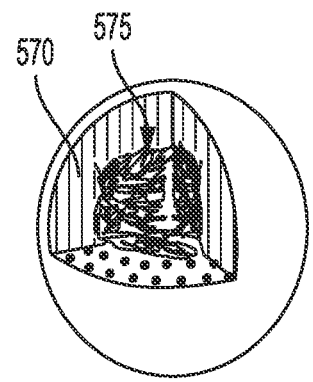
FIG. 31 is a schematic cutaway view of an illustrative expandable pellet processed to have crystallinity along outer surfaces of the pellet.

As shown in FIG. 31, at least some of expandable pellets 300 can be configured, such as by preprocessing, to have crystallinity along outer surfaces 570 of the pellets. Crystallinity and/or semi-crystallinity along outer surfaces 570 of expandable pellets 300 helps to prevent the pellets from sintering to each other. Expandable pellets 300 can be produced such that outer surfaces 570 have a high degree of crystallinity (e.g., a high percentage of the volume of regions of each pellet near the outer surface is crystalline). The crystallinity can be induced in expandable pellets 300 by controlling one or more factors including the material composition of the pellets, the production temperatures to which the pellets are heated during production, the times for which the pellet temperatures are maintained at the production temperatures during production, electric and/or magnetic fields applied during production, distribution of blowing agent 302 in the pellets, composition and/or concentration of blowing agent, and so on. Outer surfaces 570 can be crystalline before foaming, during foaming, and/or after foaming.

In the example depicted in FIG. 31, expandable pellet 300 has a higher degree of crystallinity proximal outer surfaces 570 than along inner portions 575. However, in other examples, inner portions 575 can have a degree of crystallinity similar to the degree of crystallinity proximal outer surfaces 570.

Expandable pellets 300 can be configured to shrink when cooled from the curing temperature to a lower temperature. For example, expandable pellets 300 that are configured to foam when heated to the curing temperature can shrink when cooled. If any of expandable pellets 300 have sintered together during curing of workpiece assembly 200 to form a larger block of material, the shrinkage can cause portions of the larger block to shrink, disintegrate, weaken, and/or break, facilitating removal of the larger block from cavity 215.

Additional pellets 370 and magnetically attractable beads 410, as described above, can help to prevent expandable pellets 300 from sintering together into large blocks of material. Additional pellets 370 and magnetically attractable beads 410 typically do not sinter to expandable pellets 300, and therefore the presence of the additional pellets and/or magnetically attractable beads amongst the expandable pellets can disrupt the formation of large blocks of fused expandable pellets.

g. Expandable Pellets Enclosed in Bag

Figure 32:
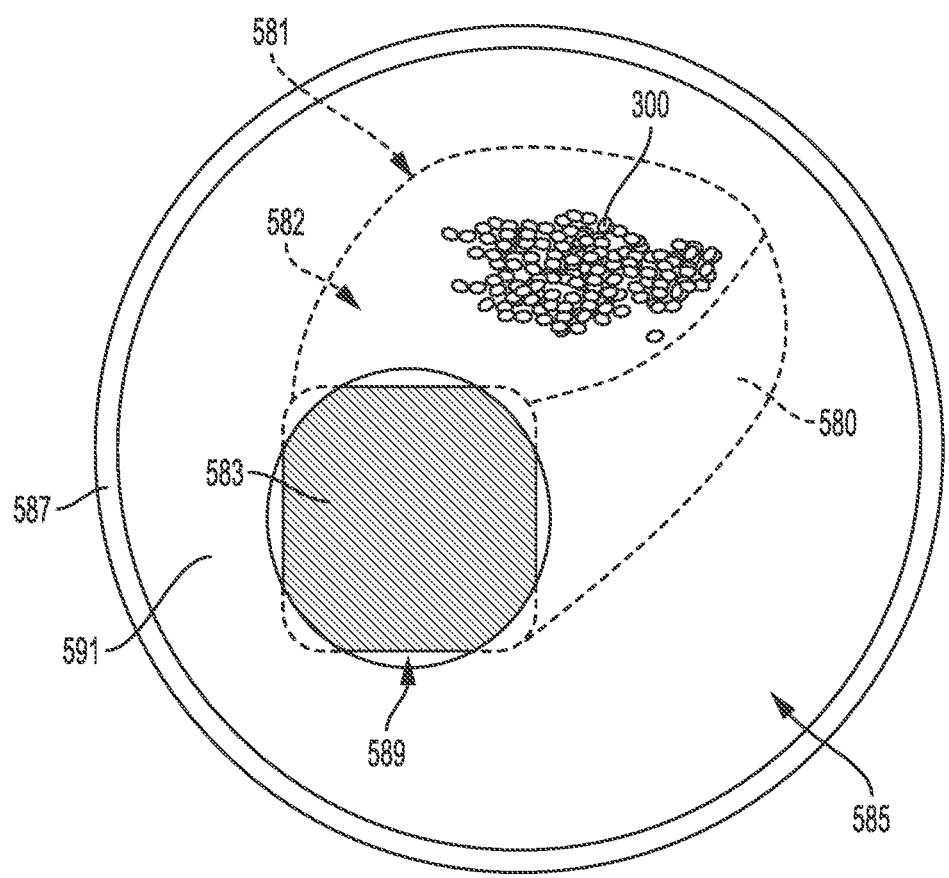
FIG. 32 is a schematic diagram depicting an illustrative bag containing expandable pellets and disposed within an illustrative complex workpiece assembly.

FIG. 32 depicts an illustrative bag 580 configured to contain pellets 300. in this example, bag 580 has at least one wall portion 581 defining a bag interior 582, and at least one end cap 583. Bag 580 is configured to contain expandable pellets 300 and/or another type of expandable first element 250, and to allow the expandable pellets to expand (e.g., to apply a predetermined pressure to interior surfaces of a cavity containing the bag, as described above). Wall portion 581 can, for example, be configured to expand (e.g., to stretch) along with expandable pellets 300. Additionally, or alternatively, bag interior 582 defined by wall portion 581 can have a size and shape sufficient to allow expandable pellets 300 to expand by the desired amount without stretching the wall portion. Typically, end cap 583 is configured not to expand (e.g., to have a substantially constant size and/or shape during curing of the workpiece assembly). As described below, end cap 583 can be configured to retain bag 580 within the cavity of the workpiece assembly as expandable pellets 300 expand. The amount of foaming agent included in the expandable pellets or the pre-impregnation of expandable pellets can be metered to a certain dosage and pre-bagged in bags like bag 580 to enhance the production rate of workpiece assembly curing.

FIG. 32 depicts bag 580 within an illustrative complex cavity 585 of an illustrative complex workpiece assembly 587. Complex workpiece assembly 587 is an example of a workpiece assembly comprising one or more uncured composite workpieces, as described above. Complex workpiece assembly 587 and/or complex cavity 585 can have complicated and/or irregular geometrical features unsuitable for use with conventional internal tooling. Typically, complex cavity 585 has a complex cavity opening 589 within a cavity face 591, and the complex cavity opening has dimensions smaller than a maximum dimension of the cavity face. In the example depicted in FIG. 32, complex workpiece assembly 587 comprises a hollow sphere, and complex cavity opening 589 is circular and has a diameter or width smaller than cavity face 591.

As shown in FIG. 32, end cap 583 of bag 580 can be positioned against complex cavity opening 589. End cap 583 retains expandable pellets 300 within complex cavity 585 as the expandable pellets expand (e.g., during curing of complex workpiece assembly 587). End cap 583 can comprise a rigid plate, a mesh screen, a flexible non-expanding material, and or any other suitable device. Positioning end cap 583 against complex cavity opening 589 closes cavity opening 589 and may be more convenient to use rather than installing a separate closure component, such as screen 315 (see FIG. 17 and associated description). Positioning end cap 583 against complex cavity opening 589 can also seal the opening, and may be more convenient than installing seals 320. Cavity opening 589 and end cap 583 can have other configurations suitable for particular applications. For example, if end cap 583 has an oval (or rectangular) shape that is slightly larger than a cavity opening 589 that has a corresponding oval (or rectangular) shape, the end cap can be inserted through the opening and positioned to completely cover or seal the opening.

After the workpiece assembly has been cured, bag 580 can facilitate removal of expanded expandable pellets 300 from the cavity. For example, extracting expanded expandable pellets 300 from the cavity can be accomplished by removing bag 580 from the cavity while some or all of the pellets are in the bag. Because expandable pellets 300 are confined within bag 580, the likelihood that any pellets will inadvertently be left inside the cavity after an attempt to extract them is greatly reduced. Alternatively, or additionally, extracting expandable pellets 300 from the cavity can include opening bag 580 and extracting the pellets from the bag. Opening bag 580 can include puncturing wall portion 581 and/or end cap 583 to create an opening through which expandable pellets 300 can be extracted. Additionally, or alternatively, wall portion 581 and/or end cap 583 can include a hatch, door, zipper, and/or any other closure assembly configured to be opened and closed again without damaging bag 580.

Bag 580 can be used in conjunction with any extraction methods described above.

F. Illustrative Method of Manufacturing a Composite Workpiece

Figure 33:
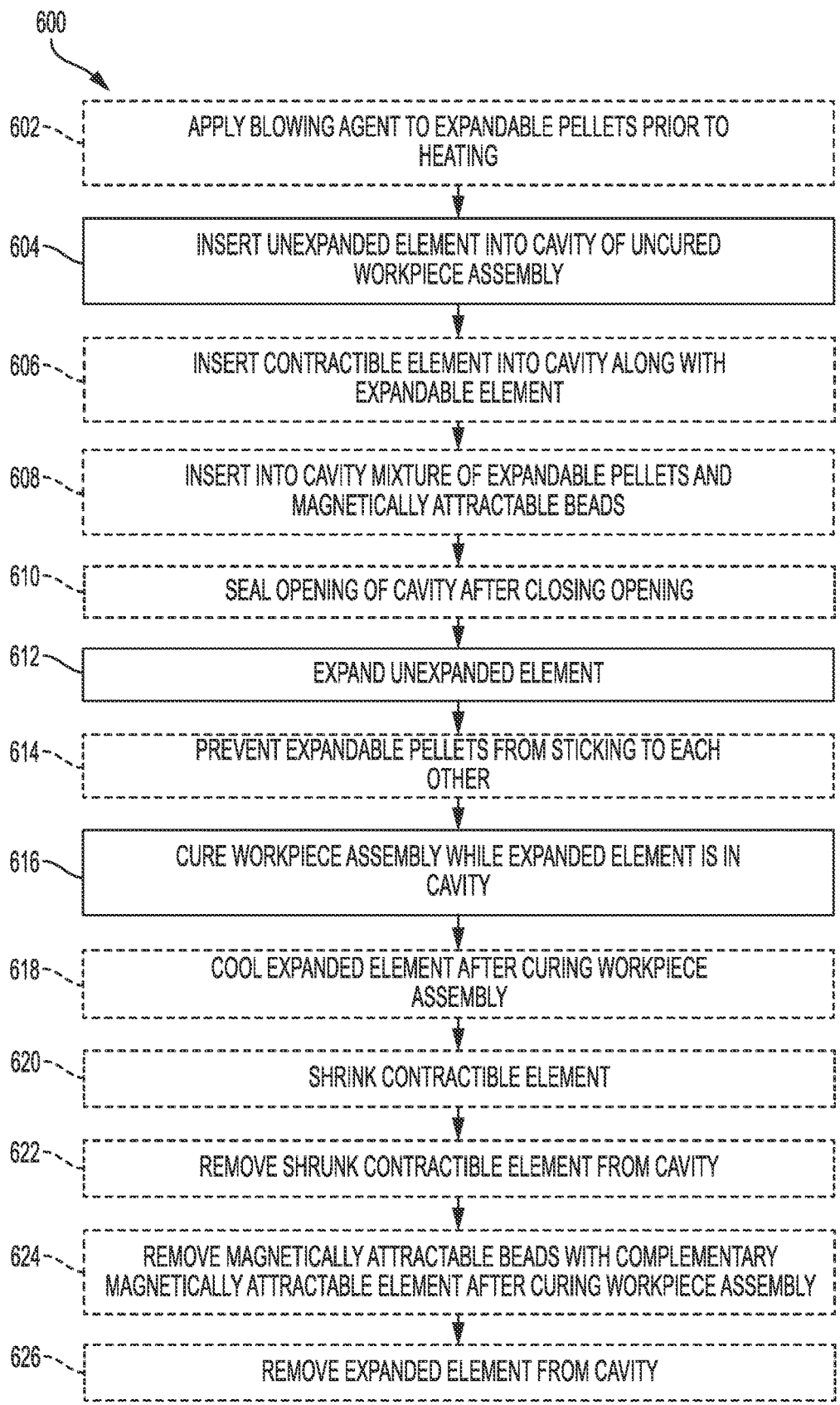
FIG. 33 is a flowchart depicting steps of an illustrative method for manufacturing a composite workpiece.

This section describes steps of an illustrative method 600 of manufacturing a composite workpiece; see FIG. 33. Expandable first element 250 and/or associated systems can be utilized in the method steps described below. Where appropriate, reference may be made to components and systems that may be used in carrying out each step. These references are for illustration, and are not intended to limit the possible ways of carrying out any particular step of the method. Reference numbers included in the description of method 600 for objects referred to are to corresponding objects described above with reference to an associated figure.

FIG. 33 is a flowchart illustrating steps performed in an illustrative method. Based on the present disclosure, it should be understood that additional steps may be performed, without departing from the present claims. Although various steps of method 600 are described below and depicted in FIG. 33, the steps need not necessarily all be performed, and in some cases can be performed simultaneously or in a different order than the order shown.

Step 602 can be included in examples wherein expandable first element 250 comprises a plurality of expandable pellets 300. At step 602, method 600 optionally includes applying blowing agent 302 to expandable pellets 300, so that expandable pellets 300 expand by foaming when heated to a predetermined foaming temperature. Blowing agent 302 is applied to expandable pellets 300 prior to heating the pellets, and is typically applied prior to inserting the pellets into cavity 215.

At step 604, method 600 includes inserting an unexpanded first element (e.g., expandable first element 250, such as expandable pellets 300, in an unexpanded state) into cavity 215 of uncured composite workpiece assembly 200. Uncured composite workpiece assembly 200 includes at least a first uncured composite workpiece, which can be a workpiece for a stiffener and/or skin for an aircraft. Inserting the first element into cavity 215 can include inserting the first element through an opening of the cavity (e.g., opening 310) and closing the opening prior to curing workpiece assembly 200.

The unexpanded first element is configured to expand when a predetermined change is produced in an attribute of the unexpanded first element. For example, the attribute can comprise a temperature of the unexpanded first element, and producing the predetermined change in the attribute can include raising the temperature of the unexpanded first element from a lower ambient temperature to at least a first predetermined expansion temperature higher than the ambient temperature.

Curing the composite workpiece assembly (see step 616) can include producing the predetermined change in the attribute. For example, if the attribute is a temperature of the unexpanded first element, curing composite workpiece assembly 200 can include raising the temperature of the unexpanded first element to at least the first predetermined expansion temperature. That is, raising the temperature of the unexpanded first element to at least the first predetermined expansion temperature can be part of the curing process.

The expandable first element inserted into cavity 215 at step 604 can include a plurality of expandable pellets. Typically, in this case, the attribute of the unexpanded first element is a temperature of the expandable pellets, and producing the predetermined change in the attribute includes heating the expandable pellets to at least a predetermined temperature.

At step 606, method 600 optionally includes inserting contractible second element 350 into the cavity along with the expandable first element. Contractible second element 350 is configured to shrink when cooled from a heated curing temperature to an ambient or otherwise lower temperature. The expandable first element can also be the contractible second element.

Step 608 can be performed in examples wherein expandable first element 250 includes a plurality of expandable pellets 300. At step 608, method 600 optionally includes, prior to curing workpiece assembly 200, inserting into the cavity a mixture of expandable pellets 300 and a plurality of magnetically attractable beads 410.

At step 610, method 600 optionally includes sealing opening 310 of cavity 215 after closing the opening. Sealing one or more openings 310 can help to maintain cavity 215 at a desired temperature and/or pressure. Sealing some or all openings of the cavity can prevent the ingress of ambient air into the cavity, which may prevent adverse reactions between the air and materials in the cavity (e.g., some examples of blowing agent 302).

At step 612, method 600 includes expanding unexpanded first element 250 by producing the predetermined change in the attribute of the expandable first element. As described above, producing the predetermined change can include heating expandable first element 250 from an ambient or otherwise lower temperature to at least a higher first predetermined expansion temperature.

Step 614 can be performed in examples wherein expandable first element 250 includes a plurality of expandable pellets 300. At step 614, method 600 optionally includes preventing expandable pellets 300 from sticking to each other when they are heated. Step 614 can further include preventing expandable pellets 300 from sticking to workpiece assembly 200 or to any tools (e.g., mold 260) used in conjunction with the curing process. Step 614 can be performed prior to inserting expandable pellets into the cavity, at the time that the pellets are inserted into the cavity, and/or during expansion of the pellets within the cavity, as appropriate.

As described above, preventing expandable pellets 300 from sticking to each other, and/or to workpiece assembly 200 or other objects, can include inserting into the cavity a mixture of the expandable pellets and additional pellets 370 configured to expand less than the expandable pellets when heated to at least the expansion temperature. Step 614 can additionally or alternatively include coating at least some of expandable pellets 300 with lubricant, processing the expandable pellets to produce crystallinity along outer surfaces of the pellets. Additionally, or alternatively, step 614 can comprise manufacturing expandable pellets 300 such that they comprise a first component configured to expand when heated and a second component configured to facilitate separation of the expandable pellets from each other after expansion.

As mentioned above, at step 616, method 600 includes curing workpiece assembly 200 while expanded expandable first element 250 is in cavity 215. Curing composite workpiece assembly 200 can include producing the predetermined change in expandable first element 250 that causes the first element to expand. That is, step 616 can include step 612.

At step 618, method 600 optionally includes cooling expanded first element 250 after curing composite workpiece assembly 200. Cooling expanded first element 250 can cause it to shrink, facilitating its removal from cavity 215.

Steps 620 and 622 are typically performed in examples wherein step 606 is also performed. At step 620, method 600 optionally includes shrinking contractible second element 350 by cooling the contractible second element from the heated curing temperature toward the ambient temperature. At step 622, method 600 optionally includes removing the shrunk contractible second element 350 from cavity 215.

Step 624 is typically performed in examples wherein step 608 is also performed. At step 624, method 600 optionally includes removing magnetically attractable beads 410 from cavity 215 with a complementary magnetically attractable element (e.g., complementary magnetically attractable element 415). The complementary magnetically attractable element can be positioned external to cavity 215 when removing magnetically attractable beads 410. Step 624 is performed after curing composite workpiece assembly 200. Performing step 624 prior to removing expandable first element 250 may make it easier to remove the expandable first element.

At step 626, method 600 optionally includes removing expanded expandable first element 250 from cavity 215 of cured workpiece assembly 200.

G. Illustrative Method of Manufacturing a Part Including a Workpiece

Figure 34:
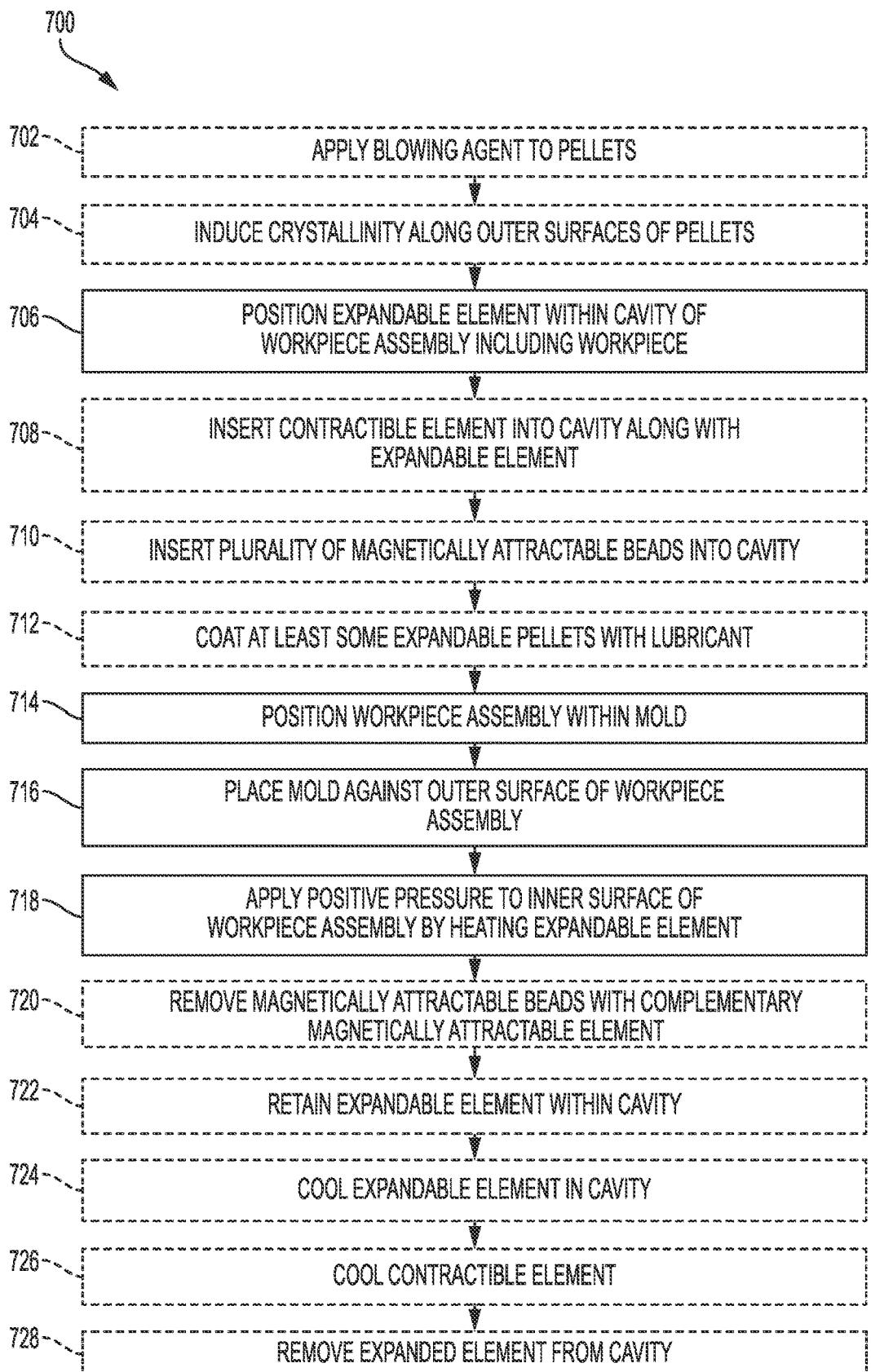
FIG. 34 is a flowchart depicting steps of an illustrative method for manufacturing a part including a workpiece.

This section describes steps of an illustrative method 700 of manufacturing a part including a workpiece; see FIG. 34. Expandable first element 250 and/or associated systems can be utilized in the method steps described below. Where appropriate, reference may be made to components and systems that may be used in carrying out each step. These references are for illustration, and are not intended to limit the possible ways of carrying out any particular step of the method. Reference numbers included in the description of method 700 for objects referred to are to corresponding objects described above with reference to an associated figure.

FIG. 34 is a flowchart illustrating steps performed in an illustrative method. Based on the present disclosure, it should be understood that additional steps may be performed, without departing from the present claims. Although various steps of method 700 are described below and depicted in FIG. 34, the steps need not necessarily all be performed, and in some cases can be performed simultaneously or in a different order than the order shown.

Step 702 can be included in examples wherein expandable first element 250 comprises a plurality of expandable pellets 300. At step 702, method 700 optionally includes applying blowing agent 302 to expandable pellets 300, so that expandable pellets 300 expand by foaming when heated to a predetermined foaming temperature. Blowing agent 302 is applied to expandable pellets 300 prior to heating the pellets, and is typically applied prior to inserting the pellets into cavity 215.

Step 704 can be included in examples wherein expandable first element 250 comprises a plurality of expandable pellets 300. At step 704, method 700 optionally includes inducing crystallinity along outer surfaces 570 of at least some of expandable pellets 300. The crystallinity facilitates removal of expandable pellets 300 from cavity 215 in later steps of method 700.

At step 706, method 700 includes positioning expandable first element 250 within cavity 215 of workpiece assembly 200, the workpiece assembly including at least a first workpiece 205. Expandable first element 250 can include a plurality of expandable pellets 300 configured to expand to respective predetermined pellet volumes when heated to the predetermined temperature. Expandable pellets 300 are configured to collectively produce a predetermined pressure against inner surface 267 of cavity 215 when heated to the predetermined temperature. Step 706 can include inserting expandable first element 250 through opening 310 of cavity 215, and can further include closing the opening prior to heating the expandable first element.

At step 708, method 700 optionally includes inserting contractible second element 350 into cavity 215 along with expandable first element 250. Contractible second element 350 is configured to shrink when cooled from a heated temperature (e.g., a temperature associated with curing workpiece assembly 200) toward an ambient temperature. Contractible second element 350 can comprise a plurality of contractible elements (e.g., pellets).

At step 710, method 700 optionally includes inserting a plurality of magnetically attractable beads 410 (e.g., magnetic and/or ferromagnetic beads) into cavity 215. Magnetically attractable beads 410 can be inserted into cavity 215 along with expandable first element 250, prior to inserting the expandable first element, and/or after inserting the expandable first element. Step 710 is performed prior to heating expandable first element 250 at step 718.

Step 712 can be performed in examples wherein expandable first element 250 includes a plurality of expandable pellets 300. At step 712, method 700 optionally includes coating at least some of expandable pellets 300 with a lubricant (e.g., lubricant 550) configured to prevent the expandable pellets from sticking to each other and/or to walls of mold 260 and/or cavity 215. Step 712 is performed prior to heating expandable pellets 300 at step 718.

At step 714, method 700 includes positioning workpiece assembly 200 within mold 260. For example, step 714 can include positioning workpiece assembly 200 between first and second mold members 262 and 264. Step 714 can be performed prior to steps 706, 708, and/or 710. That is, expandable first element 250, magnetically attractable beads 410, contractible second element 350, and/or any other components inserted into cavity 215 can be inserted into the cavity before the workpiece assembly is positioned within mold 260, after the workpiece assembly is positioned within the mold, or while the workpiece assembly is being positioned within the mold.

At step 716, method 700 includes pressing, placing, and/or positioning mold 260 against outer surface 265 of workpiece assembly 200. Mold 260 is typically configured to press or hold workpiece assembly 200 into a desired shape, e.g., a stiffener for an aircraft, or a stiffener and skin together.

At step 718, method 700 includes applying a positive pressure to inner surface 267 of workpiece assembly 200 forming cavity 215 by at least partially filling the cavity with expandable first element 250 and heating the expandable first element (e.g., from an ambient temperature) to produce a predetermined pressure against the inner surface of the workpiece assembly (e.g., against inner surface 267 of cavity 215). Heating expandable first element 250 to produce the predetermined pressure can include heating the expandable first element to a predetermined temperature for a predetermined amount of time, and/or changing the temperature of the expandable first element according to a predetermined temperature-time profile. The predetermined temperature-time profile (also called a temperature-time curve) can be defined by parameters such as a predetermined starting temperature, one or more heating rate, one or more dwelling time at a respective predetermined dwell temperature, one or more cooling rate, and/or a predetermined ending temperature, in any suitable combination. The dwell temperatures can include an elevated curing temperature suitable for curing the workpiece assembly. The temperature-time profile can also include more than one cycle of heating, dwelling, and cooling. Any heating rates and/or cooling rates specified by the temperature-time profile can be time-dependent or time-independent. Parameters of the temperature-time profile can be selected based on, e.g., properties of workpiece assembly 200 and/or expandable first element 250.

Step 720 can be performed if step 710 was performed. At step 720, method 700 includes removing magnetically attractable beads 410 from cavity 215 with complementary magnetically attractable element 415 after applying positive pressure to inner surface 267 of workpiece assembly 200 at step 718. Complementary magnetically attractable element 415 can be positioned external to the cavity.

At step 722, method 700 optionally includes retaining expandable first element 250 within cavity 215 during heating of the expandable first element. As expandable first element 250 expands, it can tend to exit and/or protrude from cavity 215 through one or more openings, apertures, and/or fissures in the cavity, thereby reducing the positive pressure applied by the expandable first element to inner surface 267. Retaining expandable first element 250 within cavity 215 helps to prevent the loss of pressure on inner surface 267. Retaining expandable first element 250 within cavity 215 can include confining the expandable first element or pellets within the cavity, such as by closing and/or sealing cavity openings, or fixing at least a portion of the expandable first element in place within the cavity, e.g., by attaching the expandable first element to inner surface 267.

At step 724, method 700 optionally includes cooling expandable first element 250 in cavity 215 after heating the expandable first element. Cooling expandable first element 250 can facilitate its removal from cavity 215, e.g., by reducing the volume of the first element so that it fits through opening 310 of the cavity. Cooling expandable first element 250 can be performed as part of one or more cycles of heating, dwelling, and cooling in step 718.

Step 726 can be performed if step 708 is performed. At step 726, method 700 optionally includes cooling contractible second element 350. Typically, step 726 includes cooling contractible second element 350 along with expandable first element 250. Additionally, or alternatively, contractible second element 350 can be cooled prior to cooling expandable first element 250 and/or after cooling expandable first element 250.

Step 728 optionally includes removing expanded expandable first element 250 from cavity 215 of workpiece assembly 200 after applying positive pressure to inner surface 267 of the workpiece assembly at step 718. This can include also removing a contracted contractible second element from the cavity.

H. Illustrative Method of Manufacturing an Aircraft Stiffener

Figure 35:
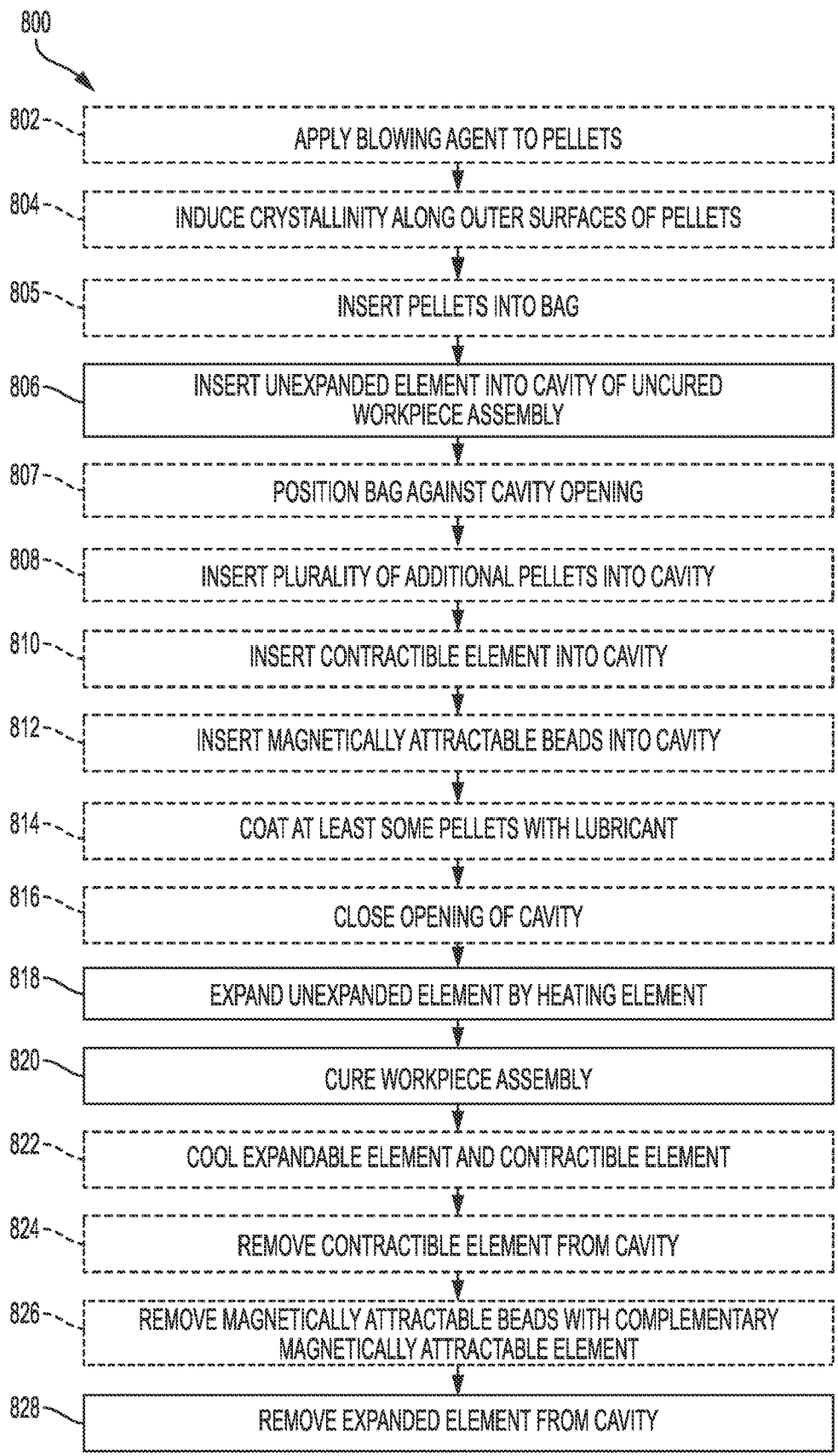
FIG. 35 is a flowchart depicting steps of an illustrative method for manufacturing an aircraft stiffener.

This section describes steps of an illustrative method 800 of manufacturing an aircraft stiffener; see FIG. 35. Expandable first element 250 and/or associated systems can be utilized in the method steps described below. Where appropriate, reference may be made to components and systems that may be used in carrying out each step. These references are for illustration, and are not intended to limit the possible ways of carrying out any particular step of the method. Reference numbers included in the description of method 800 for objects referred to are to corresponding objects described above with reference to an associated figure.

FIG. 35 is a flowchart illustrating steps performed in an illustrative method. Based on the present disclosure, it should be understood that additional steps may be performed, without departing from the present claims. Although various steps of method 800 are described below and depicted in FIG. 35, the steps need not necessarily all be performed, and in some cases can be performed simultaneously or in a different order than the order shown.

Step 802 can be performed in examples wherein expandable first element 250 includes a plurality of expandable pellets 300. At step 802, method 800 optionally includes applying blowing agent 302 to expandable pellets 300 prior to heating the expandable pellets. The blowing agent can comprise a foaming agent. Applying the blowing agent to the pellets can include metering the foaming agent to a predetermined dosage.

Step 804 can be performed in examples wherein expandable first element 250 includes a plurality of expandable pellets 300. At step 804, method 800 optionally includes inducing crystallinity along outer surfaces 570 of expandable pellets 300, such that the expandable pellets are inhibited from sticking to each other.

Step 805 can be performed in examples wherein expandable first element 250 includes a plurality of expandable pellets 300. At step 805, method 800 optionally includes inserting the plurality of expandable pellets 300 into a flexible bag (e.g., bag 580). Typically, if step 802 is performed, it is performed prior to step 805 (e.g., any foaming agent and/or blowing agent is added to the expandable pellets prior to inserting the pellets into the bag).

At step 806, method 800 includes inserting an unexpanded expandable first element 250 into cavity 215 of an uncured composite workpiece assembly 200 including a stiffener (e.g., stiffener 150). Expandable first element 250 is configured to expand when heated by a predetermined amount. In examples wherein step 805 is performed (e.g., examples wherein expandable first element 250 includes a plurality of expandable pellets within a flexible bag), step 806 can include inserting the flexible bag containing the expandable pellets into the cavity.

Cavity 215 can have an opening on a cavity face of the uncured composite workpiece assembly. Step 807 can be performed in examples wherein the cavity has such an opening, and step 805 was also performed. At step 807, method 800 optionally includes positioning a portion of the flexible bag against the opening. The portion of the bag positioned against the cavity opening is typically sufficient (e.g., in size and/or shape) to cover at least a portion of the opening. The portion of the bag positioned against the opening can comprise an end cap of the bag. Step 807, if performed, is performed after inserting the bag into the cavity at step 806.

Step 808 can be performed in examples wherein expandable first element 250 includes a plurality of expandable pellets 300. At step 808, method 800 optionally includes inserting into cavity 215 a plurality of additional pellets 370 mixed with expandable pellets 300. Additional pellets 370 can be inserted into cavity 215 prior to insertion of expandable pellets 300, and the additional pellets and the expandable pellets can be mixed together within the cavity. Alternatively, additional pellets 370 can be inserted into cavity 215 after insertion of expandable pellets 300, and the additional pellets and the expandable pellets can be mixed together within the cavity, or additional pellets 370 and expandable pellets 300 can be mixed together prior to insertion into cavity 215.

At step 810, method 800 optionally includes inserting contractible second element 350 into cavity 215 along with expandable first element 250. Contractible second element 350 can be inserted into cavity 215 before expandable first element 250, after the expandable first element, and/or at the same time as the expandable first element.

At step 812, method 800 optionally includes inserting a plurality of magnetically attractable beads 410 (e.g., magnetic and/or ferromagnetic beads) into cavity 215 prior to curing composite workpiece assembly 200. Typically, step 812 is performed in examples wherein expandable first element 250 includes a plurality of expandable pellets 300, so that removal of the magnetically attractable beads at step 826 facilitates removal of the expanded expandable pellets at step 828.

Step 814 can be performed in examples wherein expandable first element 250 includes a plurality of expandable pellets 300. At step 814, method 800 optionally includes coating at least some of expandable pellets 300 with lubricant 550 configured to facilitate separation of the expandable pellets after they are heated.

At step 816, method 800 optionally includes closing opening 310 of cavity 215 prior to curing composite workpiece assembly 200, such that expandable first element 250 and contractible second element 350, if present, are retained within the cavity.

At step 818, method 800 includes expanding expandable first element 250 by heating the first element by a predetermined amount from an ambient or other lower temperature.

At step 820, method 800 includes curing composite workpiece assembly 200. Curing composite workpiece assembly 200 can include heating the workpiece assembly and thereby heating expandable first element 250. Accordingly, steps 818 and 820 can be performed substantially simultaneously.

At step 822, method 800 optionally includes cooling expandable first element 250 and contractible second element 350 from the heated curing temperature to a cooler temperature. If contractible second element 350 is omitted (e.g., by omitting step 810), step 822 includes simply cooling expandable first element 250.

Step 824 can be performed in examples wherein step 810 has been performed. At step 824, method 800 optionally includes removing contractible second element 350 from cavity 215. Typically, contractible second element 350 is removed prior to removing expandable first element 250 from cavity 215, so that the removal of the contractible second element facilitates removal of the expandable first element.

Step 826 can be performed in examples wherein step 812 has been performed. At step 826, method 800 optionally includes removing magnetically attractable beads 410 with complementary magnetically attractable element 415 after curing composite workpiece assembly 200. Complementary magnetically attractable element 415 can be positioned external to cavity 215 to remove magnetically attractable beads 410 from the cavity.

At step 828, method 800 includes removing expanded expandable first element 250 from cavity 215 after curing composite workpiece assembly 200. Expandable first element 250 can be removed from cavity 215 using, e.g., pressurized fluid extraction system 450, vacuum extraction system 500, and/or any other suitable system configured to remove the expandable first element from the cavity.

I. Illustrative Combinations and Additional Examples

This section describes additional aspects and features of expandable tooling, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A method of manufacturing a first composite workpiece, the method comprising inserting an unexpanded expandable first element into a cavity of an uncured composite workpiece assembly including at least the first composite workpiece, the unexpanded first element being configured to expand when a predetermined change is produced in an attribute of the unexpanded first element; expanding the unexpanded first element by producing the predetermined change in the attribute of the unexpanded first element, and curing the composite workpiece assembly while the expanded first element is in the cavity.

A1. The method of paragraph A0, wherein curing the composite workpiece assembly includes producing the predetermined change in the attribute of the expandable first element.

A2. The method of any one of paragraphs A0 through A1, wherein the attribute comprises a temperature of the unexpanded first element, and producing the predetermined change in the attribute includes raising the temperature of the unexpanded first element from a first temperature to at least a predetermined second temperature higher than the first temperature.

A3. The method of paragraph A2, wherein curing the composite workpiece assembly includes raising the temperature of the unexpanded first element to at least the second temperature.

A4. The method of any one of paragraphs A2 through A3, further comprising cooling the expanded first element after curing the composite workpiece assembly.

A5. The method of any one of paragraphs A0 through A4, further comprising removing the expanded first element from the cavity of the cured workpiece assembly.

A6. The method of any one of paragraphs A0 through A5, wherein the unexpanded first element includes a plurality of expandable pellets, the attribute of the unexpanded first element is a temperature of the expandable pellets, and producing the predetermined change in the attribute of the unexpanded first element includes heating the expandable pellets to at least a predetermined first temperature.

A7. The method of paragraph A6, further comprising preventing the expandable pellets from sticking to each other when the expandable pellets are heated.

A8. The method of paragraph A7, wherein preventing the expandable pellets from sticking to each other includes inserting into the cavity a mixture of the expandable pellets and a plurality of additional pellets, the additional pellets being configured to expand less than the expandable pellets when heated to the first predetermined temperature.

A9. The method of any one of paragraphs A7 through A8, wherein preventing the expandable pellets from sticking to each other includes coating at least some of the expandable pellets with a lubricant prior to heating the expandable pellets.

A10. The method of any one of paragraphs A7 through A9, wherein preventing the expandable pellets from sticking together includes processing the expandable pellets to produce crystallinity along outer surfaces of the expandable pellets.

A11. The method of any one of paragraphs A7 through A10, wherein the expandable pellets each comprise a first component configured to expand when heated and a second component configured to facilitate separation of the expandable pellets from each other after expansion.

A12. The method of paragraph A11, wherein the expandable pellets are made of ABS plastic.

A13. The method of any one of paragraphs A7 through A12, wherein the expandable pellets sinter to each other or melt at a predetermined second temperature, and wherein curing the composite workpiece assembly includes curing the composite workpiece assembly at a temperature below the predetermined second temperature.

A14. The method of any one of paragraphs A6 through A13, further comprising applying a blowing agent to the expandable pellets prior to heating.

A15. The method of any one of paragraphs A6 through A14, further comprising inserting into the cavity a mixture of the expandable pellets and a plurality of magnetically attractable beads prior to curing the composite workpiece assembly, and removing the magnetically attractable beads with a complementary magnetically attractable element after curing the composite workpiece assembly.

A16. The method of paragraph A15, wherein removing the magnetically attractable beads with the complementary magnetically attractable element includes removing the magnetically attractable beads with the complementary magnetically attractable element positioned external to the cavity.

A17. The method of any one of paragraphs A0 through A16, wherein inserting the expandable first element into the cavity includes inserting the expandable first element through an opening of the cavity and closing the opening prior to curing the composite workpiece assembly.

A18. The method of paragraph A17, wherein closing the opening includes sealing the opening.

A19. The method of any one of paragraphs A0 through A18, further comprising inserting a contractible second element into the cavity along with the unexpanded first element, the contractible second element being configured to shrink when cooled from a heated curing temperature to a lower temperature; shrinking the contractible second element by cooling the contractible second element from the heated curing temperature toward the lower temperature; and removing the shrunk second element from the cavity.

A20. The method of paragraph A19, wherein the contractible second element includes a resilient bladder.

A21. The method of any one of paragraphs A0 through A20, wherein the first composite workpiece includes a stiffener for an aircraft wing.

A22. The method of paragraph A21, wherein the composite workpiece assembly further includes a skin for the aircraft wing, and curing the composite workpiece assembly bonds the stiffener to the skin.

B0. A method of manufacturing a part including a workpiece, the method comprising: positioning an unexpanded expandable first element within a cavity of a workpiece assembly including the workpiece; positioning the workpiece assembly within a mold; placing the mold against an outer surface of the workpiece assembly; and applying a positive pressure to an inner surface of the workpiece assembly forming the cavity by heating the unexpanded first element from a first temperature to a second temperature higher than the first temperature to expand the unexpanded first element to produce a predetermined pressure against the inner surface of the workpiece assembly.

B1. The method of paragraph B0, wherein heating the unexpanded first element to expand the unexpanded first element to produce the predetermined pressure includes heating the first element to the second temperature for a predetermined amount of time.

B2. The method of paragraph B0, wherein heating the unexpanded first element to expand the unexpanded first element to produce the predetermined pressure includes changing a temperature of the unexpanded first element according to a predetermined temperature-time profile.

B3. The method of paragraph B2, wherein the temperature-time profile includes one or a combination of two or more of a starting temperature, one or more heating rates, one or more dwelling times at predetermined temperatures, one or more cooling rates, and an ending temperature.

B4. The method of any one of paragraphs B2 and B3, wherein changing the temperature of the unexpanded first element includes changing the temperature of the unexpanded first element according to the predetermined temperature-time profile that includes cooling the first element in the cavity after heating the first element.

B5. The method of any one of paragraphs B1 through B4, wherein the expandable first element includes a plurality of expandable pellets configured to expand to respective predetermined pellet volumes when heated to the second temperature.

B6. The method of any one of paragraphs B1 through B4, wherein the expandable first element includes a plurality of expandable pellets, and the expandable pellets have a maximum dimension that is less than $1/10$ of a maximum cross-sectional dimension of the cavity.

B7. The method of any one of paragraphs B5 and B6, further comprising, prior to heating the expandable pellets, coating at least some of the expandable pellets with a lubricant configured to prevent the expandable pellets from sticking to each other.

B8. The method of any one of paragraphs B5 through B7, further comprising inducing crystallinity along outer surfaces of at least some of the expandable pellets.

B9. The method of any one of paragraphs B5 through B8, wherein the expandable pellets each include at least a first component configured to expand when heated and at least a second component configured to prevent the expandable pellets from sticking to each other.

B10. The method of paragraph B9, wherein the expandable pellets are made of ABS plastic.

B11. The method of any one of paragraphs B5 through B10, further comprising applying a blowing agent to the expandable pellets prior to heating.

B12. The method of any one of paragraphs B0 through B11, further comprising cooling the expanded first element in the cavity after heating the first element.

B13. The method of paragraph B12, further comprising inserting a contractible second element into the cavity along with the expandable first element and cooling the contractible second element along with the expandable first element, the contractible second element being configured to shrink when cooled from a warmer temperature toward a cooler temperature.

B14. The method of paragraph B13, wherein the contractible second element comprises a plurality of contractible pellets.

B15. The method of any one of paragraphs B0 through B14, further comprising removing the expanded first element from the cavity of the workpiece assembly after applying the positive pressure to the inner surface of the workpiece assembly.

B16. The method of any one of paragraphs B0 through B15, further comprising inserting a plurality of magnetically attractable beads into the cavity prior to heating the expandable first element, and removing the magnetically attractable beads with a complementary magnetically attractable element after applying the positive pressure to the inner surface of the workpiece assembly.

B17. The method of paragraph B16, wherein removing the magnetically attractable beads with the complementary magnetically attractable element includes removing the magnetically attractable beads with the complementary magnetically attractable element positioned external to the cavity.

B18. The method of any one of paragraphs B0 through B17, wherein inserting the expandable first element into the cavity includes inserting the expandable first element through an opening of the cavity and closing the opening prior to heating the expandable first element.

B19. The method of any one of paragraphs B0 through B18, further comprising retaining the expandable first element within the cavity during heating of the expandable first element.

B20. The method of any one of paragraphs B0 through B18, wherein the cavity has an opening on a cavity face, the opening having dimensions smaller than a maximum dimension of the cavity face, the method further comprising retaining the expandable first element within the cavity during heating of the expandable first element by closing the opening.

B21. The method of any one of paragraphs B0 through B20, wherein the workpiece is a stiffener for an aircraft wing.

B22. The method of paragraph B21, wherein the workpiece assembly further includes a skin for the aircraft wing.

C0. A method of manufacturing an aircraft stiffener, the method comprising inserting an unexpanded first element into a cavity of an uncured composite workpiece assembly including the stiffener, the unexpanded first element being configured to expand when heated by a predetermined amount; expanding the unexpanded first element by heating the first element by a predetermined amount from a first temperature; curing the composite workpiece assembly while the expanded first element is in the cavity; and removing the expanded first element from the cavity after curing the composite workpiece assembly.

C1. The method of paragraph C0, wherein the uncured composite workpiece assembly further includes an aircraft skin, and wherein curing the composite workpiece assembly bonds the stiffener to the skin.

C2. The method of any one of paragraphs C0 through C1, further comprising inserting a contractible second element into the cavity along with the expandable first element, the contractible second element being configured to shrink when cooled from an elevated curing temperature to a lower temperature; cooling the first element and the contractible second element from the curing temperature to the lower temperature; and prior to removing the first element from the cavity, removing the contracted second element from the cavity to facilitate removal of the first element.

C3. The method of paragraph C2, wherein inserting the expandable first element and the contractible second element into the cavity includes inserting the expandable first element and the contractible second element through an opening of the cavity, and further comprising closing the opening prior to curing the composite workpiece assembly such that the expandable first element and the contractible second element are retained within the cavity.

C4. The method of any one of paragraphs C0 through C3, wherein the expandable first element includes a plurality of expandable pellets configured to expand collectively to produce a predetermined pressure against an inner surface of the composite workpiece assembly when heated by the predetermined amount from the first temperature.

C5. The method of paragraph C4, further including inserting into the cavity a plurality of additional pellets mixed with the expandable pellets, the additional pellets being configured to expand less than the expandable pellets when heated by the predetermined amount from the first temperature.

C6. The method of any one of paragraphs C4 through C5, wherein the expandable pellets sinter to each other or melt at a predetermined second temperature, and wherein heating the expandable first element by a predetermined amount from the first temperature includes heating the expandable pellets to an expansion temperature below the predetermined second temperature.

C7. The method of any one of paragraphs C4 through C6, further including, prior to heating the expandable pellets, coating at least some of the expandable pellets with a lubricant configured to facilitate separation of the expandable pellets after heating.

C8. The method of paragraph C7, wherein the lubricant comprises a powder.

C9. The method of any one of paragraphs C4 through C8, further including inducing crystallinity along outer surfaces of the expandable pellets, such that the expandable pellets are inhibited from sticking to each other.

C10. The method of any one of paragraphs C4 through C9, wherein the expandable pellets each comprise at least a first component configured to expand when heated and a second component configured to facilitate separation of the expandable pellets from each other after expansion.

C11. The method of paragraph C10, wherein the expandable pellets are made of ABS plastic.

C12. The method of any one of paragraphs C4 through C11, further comprising applying a blowing agent to the expandable pellets prior to heating.

C13. The method of any one of paragraphs C4 through C12, further comprising inserting a plurality of magnetically attractable beads into the cavity prior to curing the composite workpiece assembly, and removing the magnetically attractable beads with a complementary magnetically attractable element after curing the composite workpiece assembly.

C14. The method of any one of paragraphs C4 through C13, further comprising inserting the plurality of expandable pellets into a flexible bag, and wherein inserting the expandable first element includes inserting the bag containing the plurality of expandable pellets into the cavity.

C15. The method of paragraph C14, wherein the cavity has an opening on a cavity face, and the method further comprises, after inserting the bag into the cavity, positioning a portion of the bag against the opening sufficient to cover at least a portion of the opening.

C16. The method of any one of paragraphs C14 and C15, further comprising metering a foaming agent added to the plurality of expandable pellets to a predetermined dosage prior to inserting the plurality of expandable pellets into the bag.

C17. The method of any one of paragraphs C0 through C16, wherein removing the expanded first element from the cavity includes extracting the expanded first element from the cavity with a force provided by a vacuum.

C18. The method of any one of paragraphs C0 through C17, wherein removing the expanded first element from the cavity includes extracting the expanded first element from the cavity with a force provided by pressurized gas.

Advantages, Features, and Benefits

The different examples of the expandable tooling systems and methods described herein provide several advantages over known solutions for applying positive pressure to a composite workpiece assembly while curing the assembly. For example, illustrative examples described herein allow tooling that is adaptive to various shapes, and typically does not need to be tailored to specific dimensions and/or geometry of the composite workpiece assembly. Furthermore, illustrative embodiments and examples described herein allow for manufacturing composite parts having a complicated shape, and/or including a cavity having a complicated shape, without manufacturing internal tooling having a corresponding complicated shape. Accordingly, the high cost of manufacturing the complicated internal tooling is saved.

Additionally, and among other benefits, illustrative examples described herein allow tooling that is tailorable to the pressure and temperatures associated with curing a specific composite workpiece assembly.

Additionally, and among other benefits, illustrative examples described herein allow tooling that is easily inserted and easily removed from the composite workpiece assembly. Compared to fly-away tooling that remains in place within the cured workpiece, the removable tooling allows the cured workpiece to be lighter in weight, and to be more reliably and accurately inspected (e.g., by non-destructive inspection methods such as ultrasonic imaging).

Additionally, and among other benefits, illustrative examples described herein allow tooling that is environmentally preferred. For example, expandable foam pellets can comprise a recyclable material such as polyethylene terephthalate (PET), a material from renewable resources, and/or a biodegradable material such as polylactide (PLA).

No known system or device can perform these functions. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of manufacturing a first composite workpiece, the method comprising:
inserting a plurality of unexpanded pellets into a cavity of an uncured composite workpiece assembly including at least the first composite workpiece, the plurality of unexpanded pellets being configured to expand when a predetermined change is produced in an attribute of the plurality of unexpanded pellets;
expanding the plurality of unexpanded pellets in the cavity by producing the predetermined change in the attribute of the plurality of unexpanded pellets;
curing the composite workpiece assembly while the plurality of expanded pellets remain discrete from one another in the cavity; and
removing the plurality of expanded pellets from the cavity of the cured workpiece assembly.

2. The method of claim 1, wherein curing the composite workpiece assembly includes producing the predetermined change in the attribute of the plurality of unexpanded pellets.

3. The method of claim 1, wherein the attribute of the plurality of unexpanded pellets is a temperature of the plurality of unexpanded pellets, and wherein producing the predetermined change in the attribute of the plurality of unexpanded pellets includes heating the plurality of unexpanded pellets to at least a predetermined first temperature.

4. The method of claim 1, further comprising:
inserting a contractible element into the cavity along with the plurality of unexpanded pellets, the contractible element being configured to shrink when cooled from a heated curing temperature to a lower temperature;
shrinking the contractible element by cooling the contractible element from the heated curing temperature toward the lower temperature; and
removing the shrunken contractible element from the cavity.

5. The method of claim 4, wherein the contractible element includes a resilient bladder.

6. The method of claim 1, the method further comprising:
positioning the uncured composite workpiece assembly within a mold such that an outer surface of the workpiece assembly is placed against the mold;
wherein expanding the plurality of unexpanded pellets includes applying a positive pressure to an inner surface of the workpiece assembly forming the cavity by heating the plurality of unexpanded pellets from a first temperature to a second temperature higher than the first temperature to expand the plurality of unexpanded pellets to produce a predetermined pressure against the inner surface of the workpiece assembly.

7. The method of claim 6, wherein heating the plurality of unexpanded pellets includes changing a temperature of the plurality of unexpanded pellets according to a predetermined temperature-time profile.

8. The method of claim 7, wherein the temperature-time profile includes one or a combination of two or more of a starting temperature, one or more heating rates, one or more dwelling time at a predetermined temperature, one or more cooling rates, and an ending temperature.

9. The method of claim 6, wherein removing includes removing the plurality of expanded pellets from the cavity of the cured workpiece assembly after applying the positive pressure to the inner surface of the workpiece assembly.

10. The method of claim 6, further comprising inserting a plurality of magnetically attractable beads into the cavity prior to heating the plurality of unexpanded pellets, and removing the magnetically attractable beads with a complementary magnetically attractable element after applying the positive pressure to the inner surface of the workpiece assembly.

11. The method of claim 1, wherein individual pellets of the plurality of unexpanded pellets have a maximum dimension that is less than $\frac{1}{10}$ of a maximum cross-sectional dimension of the cavity.

12. The method of claim 1, wherein the cavity has an opening on a cavity face, the opening having dimensions smaller than a maximum dimension of the cavity face, the method further comprising retaining the plurality of unexpanded pellets within the cavity during expanding the plurality of unexpanded pellets by closing the opening.

13. The method of claim 1, wherein the uncured composite workpiece assembly includes an aircraft stiffener and an aircraft skin, and wherein curing the composite workpiece assembly bonds the aircraft stiffener to the aircraft skin.

14. The method of claim 1, wherein inserting the plurality of unexpanded pellets includes inserting a flexible bag containing the plurality of unexpanded pellets into the cavity.

15. The method of claim 14, wherein the cavity has an opening on a cavity face, and the method further comprises, after inserting the bag into the cavity, positioning a portion of the bag against the opening sufficient to cover at least a portion of the opening.

16. A method of manufacturing a first composite workpiece, the method comprising:
inserting an unexpanded expandable first element into a cavity of an uncured composite workpiece assembly including at least the first composite workpiece, the unexpanded first element being configured to expand when a predetermined change is produced in an attribute of the unexpanded first element;
inserting a contractible second element into the cavity, the contractible second element being configured to shrink when cooled from a heated curing temperature to a lower temperature;
expanding the unexpanded first element by producing the predetermined change in the attribute of the unexpanded first element;
curing the composite workpiece assembly at a heated curing temperature while the expanded first element is in the cavity;
shrinking the contractible second element by cooling the contractible second element from the heated curing temperature toward the lower temperature; and
removing the shrunken second element from the cavity.

17. The method of claim 16, wherein the contractible second element includes a resilient bladder.

18. The method of claim 16, further comprising removing the expanded first element from the cavity of the cured workpiece assembly.

19. The method of claim 18, wherein removing the shrunken second element from the cavity is performed prior to removing the expanded first element from the cavity to facilitate removal of the expanded first element.

20. The method of claim 16, wherein the expandable first element includes a plurality of unexpanded pellets, and wherein individual pellets of the plurality of unexpanded pellets have a maximum dimension that is less than $\frac{1}{10}$ of a maximum cross-sectional dimension of the cavity.

* * * * *